US012748616B2

(12) United States Patent
Furuto et al.

(10) Patent No.: US 12,748,616 B2
(45) Date of Patent: Sep. 29, 2026

(54) ON-BOARD DEVICE, INFORMATION PROCESSING METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ken Furuto, Yokkaichi (JP); Koji Yasuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 483 days.

(21) Appl. No.: 18/546,878

(22) PCT Filed: Feb. 10, 2022

(86) PCT No.: PCT/JP2022/005375
§ 371 (c)(1),
(2) Date: Aug. 17, 2023

(87) PCT Pub. No.: WO2022/181357
PCT Pub. Date: Sep. 1, 2022

(65) Prior Publication Data

US 2024/0134679 A1 Apr. 25, 2024
US 2024/0231884 A9 Jul. 11, 2024

(30) Foreign Application Priority Data

Feb. 24, 2021 (JP) ................................ 2021-027792

(51) Int. Cl.
*G06F 9/455* (2018.01)

(52) U.S. Cl.
CPC .................... *G06F 9/45558* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS 8,281,303 B2 * 10/2012 Kani ..................... G06F 9/5077 718/1
2004/0221290 A1 * 11/2004 Casey ................. G06F 9/45558 718/104

(Continued)

FOREIGN PATENT DOCUMENTS

CN 112153116 A * 12/2020 ............. G06F 9/544
JP S63-20541 A 1/1988

(Continued)

OTHER PUBLICATIONS

International Search Report, Application No. PCT/JP2022/005375, mailed Apr. 26, 2022. ISA/Japan Patent Office.

*Primary Examiner* — Charles E Anya
(74) *Attorney, Agent, or Firm* — Brooks Kushman P.C.

(57) ABSTRACT

An on-board device includes: a control unit in which a plurality of virtual devices serve as an operation environment for programs; and a storage unit that stores a virtualization operating system. Each of the virtual devices: includes a communication buffer to which an area from the storage unit is assigned; and writes the communication data addressed to another virtual device, to the virtual device's own communication buffer when communicating with the other virtual device, a management unit that manages the virtual devices: reads out the communication data written to the communication buffer; writes the communication data to a storage area that is accessible to the management unit; and (Continued)

writes the communication data written to the storage area to the communication buffer of the other virtual device. The other virtual device reads out the communication data transmitted from the virtual device, written to the other virtual device's own communication buffer.

16 Claims, 14 Drawing Sheets

(56) References Cited

U.S. PATENT DOCUMENTS

| | | | | |
|---|---|---|---|---|
| 2005/0086237 | A1* | 4/2005 | Monnie | G06F 9/544 |
| 2007/0288921 | A1 | 12/2007 | King et al. | |
| 2016/0328254 | A1* | 11/2016 | Ahmed | G06F 9/45545 |
| 2018/0004680 | A1* | 1/2018 | Elzur | G06F 12/145 |
| 2021/0019170 | A1* | 1/2021 | Sugano | G06F 11/07 |
| 2021/0051083 | A1* | 2/2021 | Gowan | H04L 12/4641 |
| 2022/0137995 | A1* | 5/2022 | Kashtan | G06F 1/14 718/1 |

FOREIGN PATENT DOCUMENTS

| | | | | |
|---|---|---|---|---|
| JP | 2019-179397 | A | 10/2019 | |
| JP | WO 2019188233 | A1 * | 10/2019 | G06F 15/167 |
| JP | WO 2020261519 | A1 * | 12/2020 | B60W 50/0205 |

* cited by examiner

FIG. 4

Transmission buffer

| Identifier (message ID) | Data length | Communication data | Transmission buffer update flag |
|---|---|---|---|
| xxxx | xxxx | xxxxxxxxxxxxxxx | On |
| xxxx | xxxx | xxxxxxxxxxxxxxx | Off |
| ⋮ | ⋮ | ⋮ | ⋮ |

FIG. 5

Reception buffer

| Identifier (message ID) | Data length | Communication data | Reception buffer update flag |
|---|---|---|---|
| xxxx | xxxx | xxxxxxxxxxxxxxx | On |
| xxxx | xxxx | xxxxxxxxxxxxxxx | Off |
| ⋮ | ⋮ | ⋮ | ⋮ |

FIG. 10

| Storage unit | First computation device | | Second computation device | | |
|---|---|---|---|---|---|
| | First virtual ECU | First management unit | Second virtual ECU | Third virtual ECU | Second management unit |
| First transmission buffer | Accessible | Accessible | — | — | — |
| First reception buffer | Accessible | Accessible | — | — | — |
| Second transmission buffer | — | — | Accessible | — | Accessible |
| Second reception buffer | — | — | Accessible | — | Accessible |
| Third transmission buffer | — | — | — | Accessible | Accessible |
| Third reception buffer | — | — | — | Accessible | Accessible |
| Storage area | — | Accessible | — | — | Accessible |

Address table

| Identifier | Logical address | Physical address |
|---|---|---|
| XXXXX | XXXXXXXXXX | XXXXXXXXXX |
| XXXXX | XXXXXXXXXX | XXXXXXXXXX |
| . . . | . . . | . . . |

FIG. 15

ON-BOARD DEVICE, INFORMATION PROCESSING METHOD, AND COMPUTER PROGRAM

CROSS-REFERENCE TO RELATED APPLICATIONS

This application is the U.S. national stage of PCT/JP2022/005375 filed on Feb. 10, 2022, which claims priority of Japanese Patent Application No. JP 2021-027792 filed on Feb. 24, 2021, the contents of which are incorporated herein.

TECHNICAL FIELD

The present disclosure relates to an on-board device, an information processing method, and a computer program.

BACKGROUND

There is a known electronic control device that is mounted on a vehicle and performs information processing related to control of devices mounted on the vehicle and control of travel such as external communication, autonomous driving, and so on (for example, JP 2019-179397A). The electronic control device according to JP 2019-179397A includes a multi-core CPU (Central Processing Unit) that has a plurality of cores. A plurality of program systems run on the multi-core CPU. A hypervisor, which is a constituent element of the functions realized through execution of a program, is installed in the above-described electronic control device. The above-described electronic control device uses the hypervisor to create a plurality of virtual devices on the multi-core CPU and run them in parallel, and run an OS (Operation System) on the created virtual devices.

In the electronic control device according to JP 2019-179397A, communication may be performed between a plurality of virtual devices via a storage unit such as a memory included in the electronic control device. In the above communication, communication data is exchanged between a plurality of virtual devices by a transmission source virtual device writing communication data to a storage unit and a transmission destination virtual device reading the communication data written to the storage unit. At this time, there is a risk that communication between the plurality of virtual devices is not efficiently carried out due to the fact that the communication data is read out while the communication data is being written to the storage unit, i.e., due to the occurrence of a so-called access conflict.

The present disclosure has been made in view of such circumstances, and aims to provide an on-board device and so on in which communication data can be efficiently exchanged between a plurality of virtual devices.

SUMMARY

An on-board device according to one aspect of the present disclosure includes: a control unit that executes a plurality of programs; and a storage unit that stores therein a virtualization operating system that is started up by the control unit. A plurality of virtual devices that serve as operation environments for the programs are generated by starting up the virtualization operating system, each of the virtual devices: includes a communication buffer to which an area divided from the storage unit is assigned, and to which communication data that is exchanged through communication between the plurality of virtual devices is to be written; and writes the communication data addressed to another virtual device, to the virtual device's own communication buffer when communicating with the other virtual device, a management unit that manages the plurality of virtual devices: reads out the communication data written to the communication buffer of the virtual device, during a period in which the virtual device is not operating; writes the communication data thus read out, to a storage area that is accessible to the management unit; and writes the communication data written to the storage area, to the communication buffer of the other virtual device, during a period in which the other virtual device that is a transmission destination of the communication data is not operating, and the other virtual device reads out the communication data transmitted from the virtual device, written to the other virtual device's own communication buffer.

Advantageous Effects

According to an aspect of the present disclosure, communication data can be efficiently exchanged between a plurality of virtual devices.

BRIEF DESCRIPTION OF DRAWINGS

FIG. 4 is a schematic diagram illustrating a configuration of a transmission buffer.

FIG. 5 is a schematic diagram illustrating a configuration of a reception buffer.

FIG. 10 is an illustration of an example of access limitation on a communication buffer and a storage area.

FIG. 15 is a conceptual diagram illustrating the content of an address table.

DETAILED DESCRIPTION OF PREFERRED EMBODIMENTS

Figure 1:
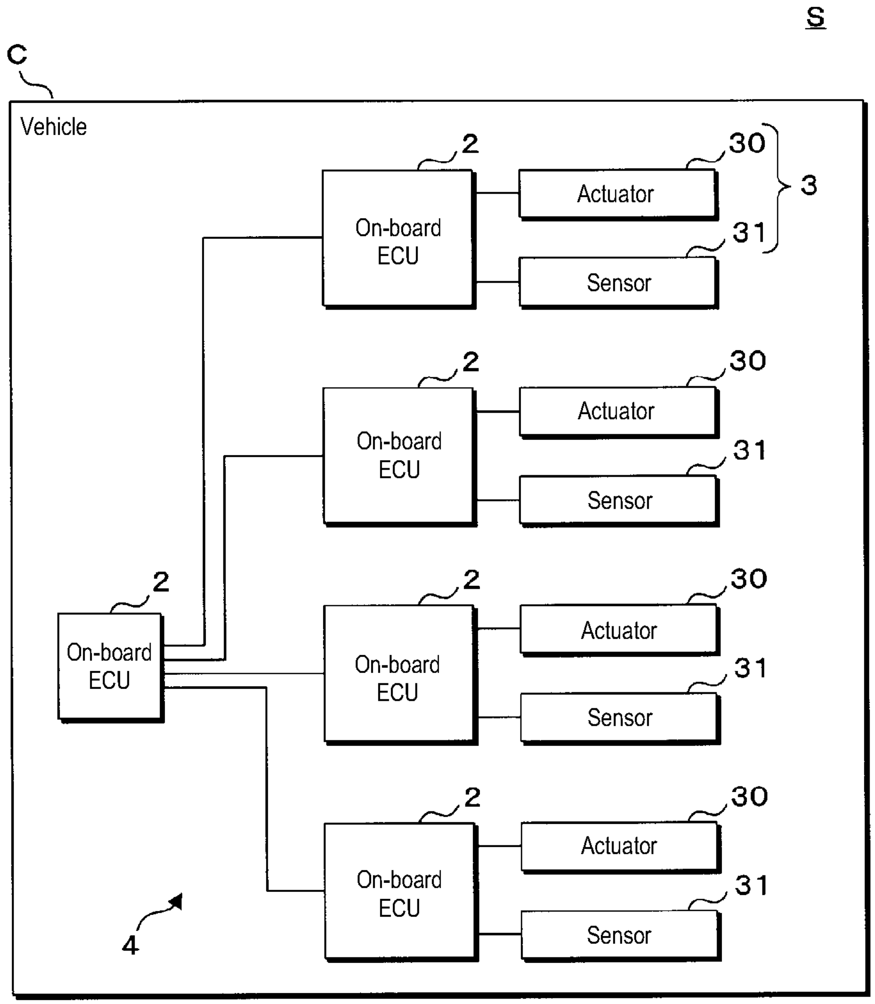
FIG. 1 is a schematic diagram illustrating a configuration of an on-board system according to a first embodiment.

First, embodiments of the present disclosure will be listed and described. At least one or more of the embodiments described below may be freely combined with each other.

An on-board device according to one aspect of the present disclosure includes: a control unit that executes a plurality of programs; and a storage unit that stores therein a virtualization operating system that is started up by the control unit. A plurality of virtual devices that serve as operation environments for the programs are generated by starting up the virtualization operating system, each of the virtual devices: includes a communication buffer to which an area divided from the storage unit is assigned, and to which communication data that is exchanged through communication between the plurality of virtual devices is to be written; and writes the communication data addressed to another virtual device, to the virtual device's own communication buffer when communicating with the other virtual device, and a management unit that manages the plurality of virtual devices: reads out the communication data written to the communication buffer of the virtual device, during a period in which the virtual device is not operating; writes the communication data thus read out, to a storage area that is accessible to the management unit; and writes the communication data written to the storage area, to the communication buffer of the other virtual device, during a period in which the other virtual device, which is a transmission destination of the communication data, is not operating, and the other virtual device reads out the communication data transmitted from the virtual device, written to the other virtual device's own communication buffer.

In this aspect, the plurality of virtual devices are generated by the control unit starting up the virtualization operating system. Each of the virtual devices includes, for example, a virtual control unit to which the control unit subjected to time-division is periodically assigned, and a communication buffer. The plurality of virtual devices are managed by the management unit. The management unit corresponds to a process that is generated to execute a management program for managing the virtual devices generated by the virtualization operating system. One virtual device of the plurality of virtual devices, when communicating with another virtual device, writes communication data to be transmitted to the other virtual device, to the communication buffer of the one virtual device. The management unit reads out the communication data written to the communication buffer of the one virtual device, during a period in which the one virtual device is not operating, for example, a period in which the virtual control unit of the one virtual device is not assigned to the control unit. The management unit writes the communication data thus read out, to the storage area. The management unit writes the communication data written to the storage area, to the communication buffer of the other virtual device, during a period in which the other virtual device, which is the transmission destination of the above communication data, is not operating, for example, a period in which the virtual control unit of the other virtual device is not assigned to the control unit. The other virtual device reads out the communication data written to the communication buffer of the other virtual device. The communication data transmitted from the other virtual device to the one virtual device is written to the communication buffer of the one virtual device via the storage area. The one virtual device reads out the communication data transmitted from the other virtual device, to be written to the communication buffer of the one virtual device. The communication data is exchanged between the one virtual device and the other virtual device through the management unit via the storage area. In other words, the one virtual device and the other virtual device communicate with each other via the storage area. Since the communication data is exchanged through the management unit via the storage area, the communication data is not read out by the other virtual device during a period in which the one virtual device is writing the communication data to the communication buffer. The management unit writes and reads out communication data during a period in which the virtual device is not operating. Therefore, the writing of communication data by the virtual device, to the communication buffer, and the reading out of communication data by the management unit, from the communication buffer, do not conflict with each other. Also, the writing of communication data by the management unit, to the communication buffer, and the reading of communication data by the virtual device, from the communication buffer, do not conflict with each other. Therefore, it is possible to appropriately exchange communication data between a plurality of virtual devices without conflictions between the writing and reading out of communication data, and it is possible to efficiently exchange communication data between the plurality of virtual devices.

In the on-board device according to one aspect of the present disclosure, the control unit includes a plurality of computation devices, one computation device of the plurality of computation devices functions as the management unit, and the other computation devices of the plurality of computation devices function as the virtual devices.

In this aspect, the control unit includes a plurality of computation devices. For example, if the control unit is a multi-core CPU that has a plurality of cores, the computation devices are cores. One computation device of the plurality of computation devices functions as the management unit. Virtual devices are generated by the other computation devices of the plurality of computation devices. The other computation devices function as the generated virtual devices. In the exchange of communication data between a plurality of virtual devices, the management unit realized by one computation device writes communication data written to the communication buffer of the transmission source virtual device, to the storage area. The above management unit reads out the communication data written to the storage area, from the storage area, and writes the communication data to the communication buffer of the transmission destination virtual device. The management unit realized by one computation device performs the writing and reading out of communication data to and from the storage area. Therefore, it is possible to exchange communication data between a plurality of virtual devices without conflictions between the writing and reading out of communication data to and from the storage area.

In the on-board device according to one aspect of the present disclosure, the control unit includes a plurality of computation devices, each of the computation devices: functions as the management unit or the virtual device; and periodically switches between a period in which the computation device functions as the management unit and a period in which the computation device functions as the virtual device, and a period in which one computation device of the plurality of computation devices functions as the management unit and a period in which another computation device of the plurality of computation devices functions as the management unit do not overlap each other.

In this aspect, the control unit includes a plurality of computation devices. Each computation device periodically switches between a period in which the computation device functions as the management unit and a period in which the computation device functions as the virtual device. In the period in which the computation device functions as the virtual device, the virtual device is generated in the computation device. The computation device functions as the generated virtual device. In the period in which the computation device functions as the management unit, the computation device functions as the management unit, and performs the writing and reading out of communication data to and from the communication buffer, and the writing and reading out of communication data to and from the storage area as described above. The cycle of switching between the period in which the computation device functions as the management unit and the period in which the computation device functions as the virtual device is set for each computation device so that the period in which one computation device functions as the management unit and the period in which the other computation device functions as the management unit do not overlap each other. The period in which one computation device functions as the management unit and the period in which the other computation device functions as the management unit do not overlap each other. Therefore, it is possible to exchange communication data between a plurality of virtual devices without conflictions between the writing and reading out of communication data to and from the storage area.

In the on-board device according to one aspect of the present disclosure, the one computation device functions as the management unit that manages the virtual device generated in the one computation device, the management unit that manages the virtual device generated in the one computation device: can access the communication buffer of the virtual device generated in the one computation device, and the storage area; and cannot access the communication buffer of the virtual device generated in the other computation device, and the virtual device: can access the virtual device's own communication buffer; and cannot access the communication buffer of the other virtual device or the storage area.

In this aspect, one or more virtual devices are generated in each computation device. One computation device of the plurality of computation devices functions as the virtual device generated in the one computation device. The one computation device functions as the management unit that manages the virtual device generated in the one computation device. When the one computation device functions as the management unit, the management unit can access the communication buffer of one or more virtual devices generated in the one computation device, and the storage area. Also, the above management unit cannot access the communication buffers of the virtual devices generated in the computation devices other than the one computation device. It is possible to prevent the above management unit from erroneously writing or reading out communication data to and from the communication buffers of the virtual devices generated in the other computation devices. One virtual device of the plurality of virtual devices generated in the plurality of computation devices can access the communication buffer of the one virtual device, but cannot access the communication buffers of the other virtual devices of the plurality of virtual device generated, or the storage area. It is possible to prevent the one virtual device from erroneously writing communication data to the communication buffers of the other virtual devices. Also, it is possible to prevent the one virtual device from erroneously reading out communication data written to the communication buffers of the other virtual devices. By limiting access to the communication buffer by the virtual devices and the management unit as described above, it is possible to prevent communication data from being erroneously written to an unintended communication buffer, and prevent unintended communication data from being read out from a communication buffer. Only the management unit can access the storage area, and therefore it is possible to prevent the virtual devices from erroneously writing or reading out communication data to and from the storage area.

In the on-board device according to one aspect of the present disclosure, the communication buffer includes a reception buffer to which the communication data to be received by the virtual device is written, the virtual device: reads out the communication data written to the reception buffer if a reception buffer update flag indicating that the communication data written to the reception buffer has been updated is ON; and switches the reception buffer update flag from ON to OFF after reading out the communication data.

In this aspect, each communication buffer includes a reception buffer to which communication data to be received by a virtual device is written. A reception buffer update flag is provided for each reception buffer. If the reception buffer update flag is OFF, the communication data in the reception buffer has not been updated. If the reception buffer update flag is ON, the communication data in the reception buffer has been updated, and therefore new communication data has been written to the reception buffer. If the reception buffer update flag for the reception buffer of a virtual device is ON, the virtual device reads out the new communication data written to the reception buffer. After reading out the communication data, the virtual device switches the above reception buffer update flag from ON to OFF. Therefore, it is possible to prevent communication data that has already been read out, from being read out again. By reading out communication data written to the reception buffer, based on the reception buffer update flag, the virtual device can appropriately acquire newly transmitted communication data.

In the on-board device according to one aspect of the present disclosure, the communication buffer includes a transmission buffer to which the communication data to be transmitted by the virtual device to the other virtual device is written, the virtual device turns on a transmission buffer update flag indicating that the communication data written to the transmission buffer has been updated, after writing the communication data to the transmission buffer, the management unit: writes the communication data written to the transmission buffer of the virtual device, to the storage area, if the transmission buffer update flag is ON; switches the transmission buffer update flag from ON to OFF after writing the communication data to the storage area; turns on a storage area update flag indicating that the communication data written to the storage area has been updated; writes the communication data written to the storage area, to the reception buffer of the other virtual device if the storage area update flag is ON; turns on the reception buffer update flag after writing the communication data to the reception buffer; and switches the storage area update flag from ON to OFF.

In this aspect, the communication buffers include transmission buffers to which communication data to be transmitted by virtual devices to other virtual devices is written. A transmission buffer update flag is provided for each transmission buffer. If the transmission buffer update flag is OFF, the communication data in the transmission buffer has not been updated. If the transmission buffer update flag is ON, the communication data in the transmission buffer has been updated, and therefore new communication data has been written to the transmission buffer. After writing new communication data the transmission buffer of the virtual device, the virtual device turns on the transmission buffer update flag of the transmission buffer. If the transmission buffer update flag is ON, the management unit reads out new communication data written to the transmission buffer, and writes the communication data thus read out, to the storage area. A storage area update flag is provided for the storage area. If the storage area update flag is OFF, the communication data in the storage area has not been updated. If the storage area update flag is ON, the communication data in the storage area has been updated, and therefore new communication data has been written to the storage area. After writing new communication data to the storage area, the management unit switches the transmission buffer update flag from ON to OFF, and turns on the storage area update flag. If the storage area update flag is ON, the management unit reads out the new communication data written to the storage area, and writes the communication data thus read out, to the reception buffer of the transmission destination virtual device. After writing the communication data to the reception buffer, the management unit turns on the reception buffer update flag for the reception buffer, and switches the storage area update flag from ON to OFF. As described above, the transmission destination virtual device reads out the new data written to the reception buffer of the virtual device, based on the reception buffer update flag. If the transmission buffer update flag is ON, the communication data written to the transmission buffer is read out. Therefore, it is possible to prevent the writing and reading out of communication data to and from the transmission buffer from conflicting with each other. After writing communication data to the reception buffer, the management unit turns off the storage area update flag. Therefore, the management unit can distinguish a piece of communication data that has not been written to the reception buffer from among the pieces of communication data written to the storage area. After writing communication data to the reception buffer, the management unit turns on the reception buffer update flag. Therefore, it is possible to prevent the writing and reading out of communication data to and from the reception buffer from conflicting with each other.

In the on-board device according to one aspect of the present disclosure, the communication buffer includes a transmission buffer to which the communication data to be transmitted by the virtual device to the other virtual device is written, the virtual device updates a transmission buffer count value indicating the number of times the communication data has been written to the transmission buffer, after writing the communication data to the transmission buffer, the management unit: writes the communication data written to the transmission buffer of the virtual device, to the storage area if the transmission buffer count value and a storage area count value indicating the number of times the communication data has been written to the storage area are different from each other; updates the storage area count value to the same value as the transmission buffer count value after writing the communication data to the storage area; writes the communication data written to the storage area, to the reception buffer of the other virtual device if the storage area count value and a reception buffer count value indicating the number of times the communication data has been written to the reception buffer are different from each other; updates the reception buffer count value to the same value as the storage area count value after writing the communication data to the reception buffer; and turns on the reception buffer update flag.

In this aspect, each communication buffer includes a transmission buffer. A transmission buffer count value is provided for the transmission buffer. A storage area count value is provided for the storage area. A reception buffer count value is provided for the reception buffer. The transmission buffer count value, the storage area count value, and the reception buffer count value are each provided for each communication data identifier such as a message ID. The transmission source virtual device updates the transmission buffer count value after writing the communication data to the transmission buffer of the virtual device. For example, the above virtual device increments the transmission buffer count value for the identifier related to the above communication data by one. If the transmission buffer count value and the storage area count value are different from each other, the management unit writes the above communication data written to the transmission buffer to the storage area. The case in which the transmission buffer count value and the storage area count value are different from each other is the case in which the transmission buffer count value and the storage area count value corresponding to the same identifier are different from each other. After writing the communication data to the storage area, the management unit updates the storage area count value to the same value as the transmission buffer count value. If the storage area count value and the reception buffer count value are different from each other, the management unit writes the above communication data written to the storage area, to the reception buffer of the transmission destination virtual device. The case in which the storage area count value and the storage area count value are different from each other is the case in which the storage area count value and the reception buffer count value corresponding to the same identifier are different from each other. After writing communication data to the reception buffer, the management unit updates the reception buffer count value to the same value as the storage area count value, and turns on the reception buffer update flag. The transmission destination virtual device reads out the new data written to the reception buffer of the virtual device, based on the reception buffer update flag. The communication data written to the transmission buffer is read out based on the transmission buffer count value and the storage area count value. Therefore, it is possible to prevent the writing and reading out of communication data to and from the transmission buffer from conflicting with each other. The management unit updates the storage area count value after writing communication data to the storage area. Therefore, it is possible to prevent the writing and reading out of communication data to and from the storage area from conflicting with each other. After writing communication data to the reception buffer, the management unit updates the reception buffer count value, and turns on the reception buffer update flag. Therefore, it is possible to prevent the writing and reading out of communication data to and from the reception buffer from conflicting with each other.

In the on-board device according to one aspect of the present disclosure, the communication buffer includes a program execution storage area used to execute the programs, and the management unit writes the communication data written to the storage area, to the program execution storage area of the virtual device at a transmission destination.

In this aspect, the communication buffer includes a program execution storage area used to execute a program. The program execution storage area is a so-called variable area, and is provided for each virtual device. The program execution storage area is indicated by a logical address. During execution of a program, communication data is written to the program execution storage area. The management unit writes the communication data written to the storage area, to the program execution storage area of the transmission destination virtual. The management unit writes the communication data directly to the program execution storage area. Therefore, the virtual device need not perform processing to write the communication data to the program execution storage area. Therefore, it is possible to reduce the amount of processing to be performed by the virtual device.

An information processing method according to one aspect of the present disclosure includes: generating a plurality of virtual devices that serve as operation environments for a plurality of programs, in an on-board device; when each virtual device communicates with another virtual device, writing communication data addressed to the other virtual device, to a communication buffer that is included in the virtual device and to which the communication data that is exchanged through communication between the plurality of virtual devices is to be written; reading out the communication data written to the communication buffer of the virtual device, during a period in which the virtual device is not operating; writing the communication data thus read out, to a storage area; writing the communication data written to the storage area, to the communication buffer of the other virtual device, during a period in which the other virtual device that is a transmission destination of the communication data is not operating; and reading out the communication data transmitted from the virtual device, written to the communication buffer of the other virtual device.

In this aspect, as in the aspect (1), data can be appropriately exchanged between a plurality of virtual devices without conflictions. Therefore, it is possible to efficiently exchange communication data between a plurality of virtual devices.

A computer program according to one aspect of the present disclosure is a computer program for enabling a computer mounted on a vehicle to carry out processing to: generate a plurality of virtual devices that serve as operation environments for a plurality of programs; when each virtual device communicates with another virtual device, write communication data addressed to the other virtual device, to a communication buffer that is included in the virtual device and to which the communication data that is exchanged through communication between the plurality of virtual devices is to be written; read out the communication data written to the communication buffer of the virtual device, during a period in which the virtual device is not operating; write the communication data thus read out, to a storage area; write the communication data written to the storage area, to the communication buffer of the other virtual device, during a period in which the other virtual device that is a transmission destination of the communication data is not operating; and read out the communication data transmitted from the virtual device, written to the communication buffer of the other virtual device.

In this aspect, it is possible to enable a computer to function as an on-board device according to one aspect of the present disclosure.

DETAILS OF EMBODIMENTS OF PRESENT DISCLOSURE

The present disclosure will be specifically described based on the drawings showing the embodiments thereof. An on-board device according to embodiments of the present disclosure will be described below with reference to the drawings. Note that the present disclosure is not limited to these examples, but is indicated by the scope of the claims, and is intended to include all modifications within the meaning and scope of equivalents to the scope of the claims.

First Embodiment

Hereinafter, an embodiment will be described based on the drawings. FIG. 1 is a schematic diagram illustrating a configuration of an on-board system S according to a first embodiment. The on-board system S includes a plurality of on-board ECUs 2 mounted on a vehicle C. On-board devices 3 are connected to the on-board ECUs (Electronic Control Units) 2.

The plurality of on-board ECUs 2 may include an integrating on-board ECU 2 (integrating ECU) that controls the entire vehicle C, and an individual on-board ECU 2 that is communicably connected to the integrating on-board ECU 2 and is directly connected to the on-board devices 3. The integrating on-board ECU 2 may be communicatively connected to an external server (not shown) connected to an external network such as the Internet via an external communication device (not shown). The on-board ECUs 2 correspond to the on-board device.

In FIG. 1, the integrating on-board ECU 2 and the plurality of individual on-board ECUs 2 are communicatively connected to each other by an on-board network 4 that forms a star-shaped network topology. The integrating on-board ECU 2 is located at the centre of the star-shaped network topology. The network topology of the on-board system S is not limited to the above example. The on-board system S may be configured so that adjacent individual on-board ECUs 2 are connected to each other and form a looped network topology in order to realize bi-directional communication to achieve redundancy.

The individual on-board ECUs 2 are arranged in several areas in the vehicle C and are connected to a plurality of on-board devices 3. The individual on-board ECUs 2 transmit and receive signals or data to and from the on-board devices 3 connected thereto. In addition, the individual on-board ECUs 2 communicate with the integrating on-board ECU 2. Each individual on-board ECU 2 may be a relay control ECU that serves as an on-board relay device such as a gateway or an ether switch that relays communication between the plurality of on-board devices 3 connected to the individual on-board ECU 2 or communication between the on-board devices 3 and another on-board ECU 2. In addition to relaying communication, each individual on-board ECU 2 may also function as a power distribution device that distributes and relays power output from a power storage device and supplies the power to the on-board devices 3 connected to the ECU itself.

Examples of the on-board devices 3 include actuators 30 such as a door opening/closing device and a motor device, and various sensors 31 such as a LiDAR (Light Detection and Ranging), a light sensor, a CMOS (Complementary Metal Oxide Semiconductor) camera, and an infrared sensor. The on-board devices 3 are not limited to the above examples, and may be switches such as a door SW (switch) and a lamp SW, or lamps.

The integrating on-board ECU 2 is, for example, a central control device such as a vehicle computer. The integrating on-board ECU 2 generates and outputs control signals to individual on-board ECUs 2 based on data from the on-board devices 3 relayed via other on-board ECUs 2 such as individual on-board ECUs 2. Based on information or data such as request signals output from other on-board ECUs 2, the integrating on-board ECU 2 generates control signals for controlling the actuators 30 that are the targets of the request signals, and outputs the generated control signals to the other on-board ECUs 2. In the present embodiment, the on-board system S includes the integrating on-board ECU 2 and the individual on-board ECUs 2, but the on-board system S is not limited to the configuration that includes the integrating on-board ECU 2 and the individual on-board ECUs 2. The on-board system S may include a plurality of on-board ECUs 2 connected peer-to-peer to each other by a relay device such as a CAN (Controller Area Network) gateway or an Ethernet switch.

Figure 2:
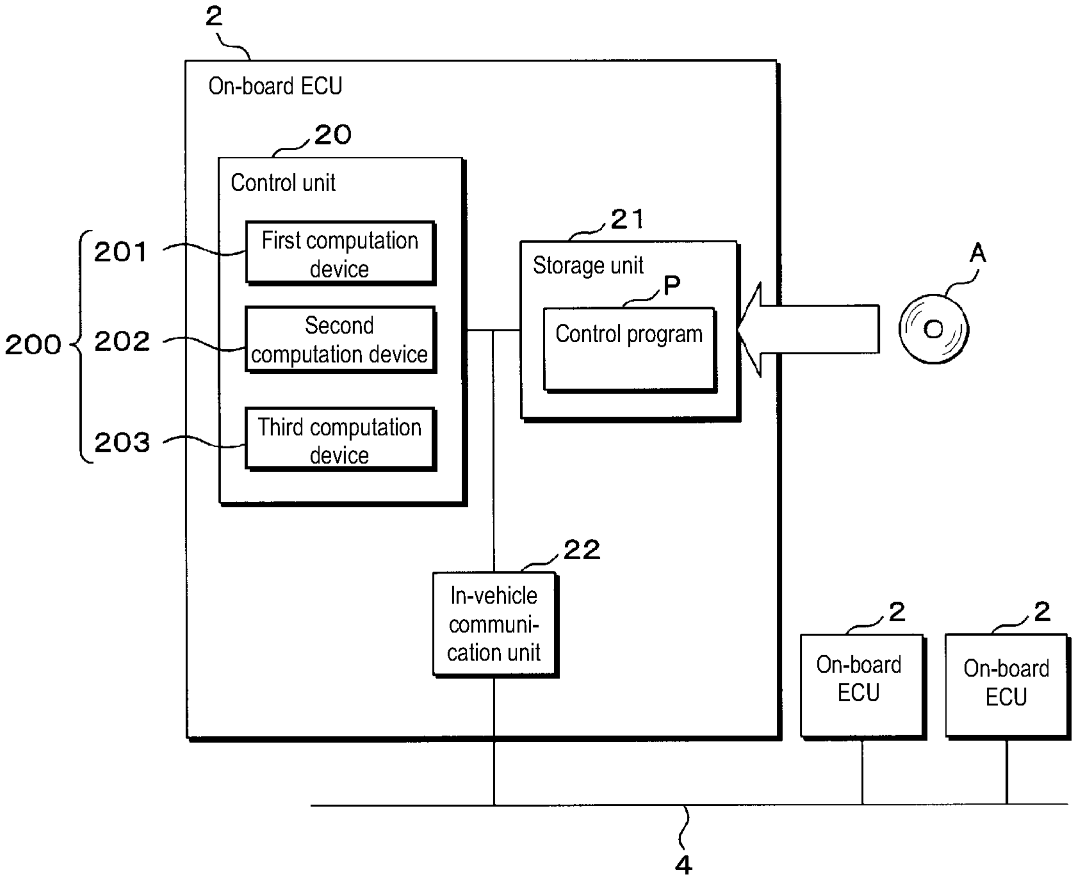
FIG. 2 is a block diagram illustrating a physical configuration of an on-board ECU.

FIG. 2 is a block diagram illustrating a physical configuration of an on-board ECU. The on-board ECU 2 includes a control unit 20, a storage unit 21, and an in-vehicle communication unit 22. The control unit 20 is constituted by a computation processing device such as a CPU or an MPU (Micro Processing Unit). The control unit 20 is configured to read out and execute control programs P and data stored in advance in the storage unit 21, thereby performing various kinds of control processing, computation processing, and so on. The control unit 20 includes, for example, a single single-core CPU, multiple single-core CPUs, a single multi-core CPU, and multiple multi-core CPUs. The control unit 20 is not limited to a software processing unit that performs software processing such as a CPU, but may include a hardware processing unit that performs various kinds of control processing and computation processing through hardware processing, such as an FPGA (Field Programmable Gate Array), an ASIC (Application Specific Integrated Circuit), or a SOC (System On a Chip).

The control unit 20 includes a computation device 200 constituted by, for example, one core of a CPU. The present embodiment describes an example in which the control unit 20 is a triple-core CPU. The control unit 20 has three cores because it is a triple-core CPU. The control unit 20 includes three computation devices 200, namely a first computation device 201 constituted by a first core, a second computation device 202 constituted by a second core, and a third computation device 203 constituted by a third core. Note that the number of computation devices 200 is not limited to three.

The storage unit 21 is constituted by a volatile memory element such as a RAM (Random Access Memory) or a non-volatile memory element such as a ROM (Read Only Memory), an EEPROM (Electrically Erasable Programmable ROM), or a flash memory. The storage unit 21 may be constituted by a combination of storage devices such as the above volatile memory elements and non-volatile memory elements. The storage unit 21 stores in advance the control programs P and data to be referred to during processing. The control programs P include, for example, a plurality of programs such as a program for controlling various on-board devices 3, a program for performing target recognition for autonomous driving based on output data from a LiDAR or CMOS camera. These programs are also referred to as applications. Furthermore, the storage unit 21 of each on-board ECU 2 stores a virtualization operating system such as Hypervisor or Xen.

Note that the control programs P stored in the storage unit 21 may be the control programs P read from a recording medium A readable by the on-board ECUs 2, and stored therein. Alternatively, the control programs P may be those downloaded from an external computer (not shown) connected to a communication network (not shown), and stored in the storage unit 21. The control programs P correspond to the computer program.

The in-vehicle communication unit 22 is an input/output interface that employs the CAN (Controller Area Network) or Ethernet (registered trademark) communication protocol, for example. The control unit 20 communicates with other on-board ECUs 2 connected to the on-board network 4 via the in-vehicle communication unit 22.

Figure 3:
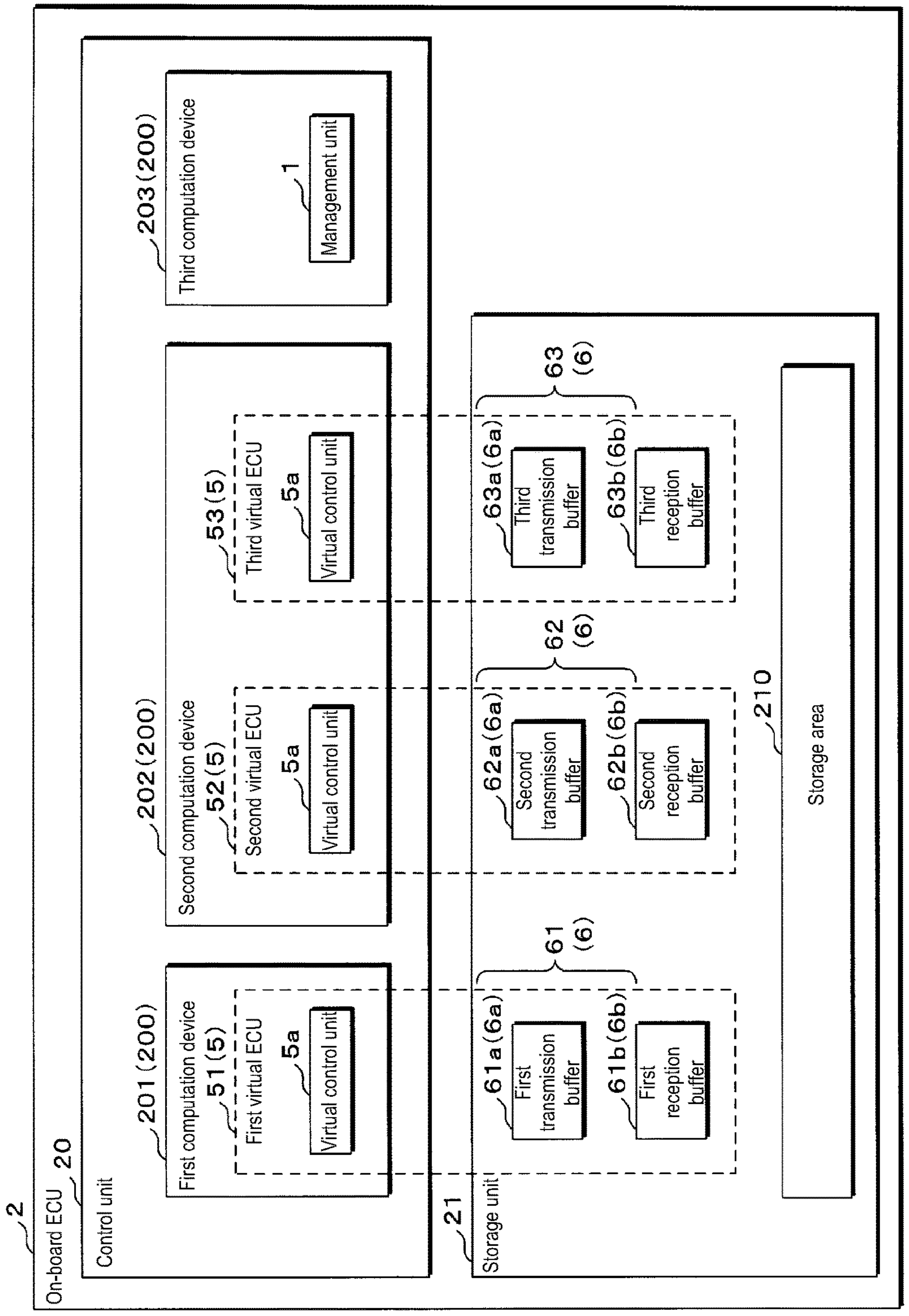
FIG. 3 is a block diagram illustrating a logical configuration of the on-board ECU.

FIG. 3 is a block diagram illustrating a logical configuration of an on-board ECU 2. As described above, the storage unit 21 of the on-board ECU 2 stores a virtualization operating system such as Hypervisor or Xen. The control unit 20 of the on-board ECU 2 starts up using a virtualization operating system, there by being able to build a plurality of virtual ECUs 5 on the virtualization operating system. The programs for controlling various on-board devices 3 are executed using one virtual ECU 5 of the plurality of virtual ECUs 5 as the operating environment. That is to say, these programs are executed on one of the virtual ECUs 5. As a result of the virtual ECU 5 executing a program, one or a plurality of tasks are generated according to the processing content of the program. Due to such tasks, more subdivided or segmented processing units can be executed.

Although the present embodiment describes an example in which the virtualization method is a hypervisor method through which hardware resources such as the control unit 20 are directly accessed by a virtualization operating system, the virtualization method is not limited to the hypervisor method. For example, the virtualization method may be a host OS method through which an operating system such as Linux (registered trademark) intervenes between the virtualization operating system and hardware resources. Also, the virtualization method may be that uses a container-type virtualization operating system.

An on-board ECU 2 started using a virtualized operating system can build a plurality of virtual ECUs 5 through the functions of the virtualization operating system. Hardware resources such as the control unit 20 and the storage unit 21 included in the on-board ECUs 2 are assigned to the plurality of virtual ECUs 5. For example, each virtual ECU 5 includes a virtual control unit 5*a* assigned to the control unit 20, a virtual storage unit (not shown) assigned to the storage unit 21, and a virtual in-vehicle communication unit (not shown) assigned to the in-vehicle communication unit 22. The virtual ECUs 5 correspond to the virtual device.

A guest OS, such as Ubuntu (registered trademark), for example, is stored in the virtual storage unit of each of the virtual ECUs 5, and each of the virtual ECUs 5 starts up the guest OS and executes programs on the guest OS. The guest OSs may be different types of OSs depending on the individual virtual ECUs 5. As described above, the entities of the virtual storage units are the storage areas of the storage unit 21 assigned to the virtual ECUs 5. Therefore, needless to say, each guest OS is stored in the storage unit 21 as with the virtualization operating system. In the case of using a container-type virtualization operating system, a guest OS may be omitted, a container may be generated on the virtualization operating system, and programs may be executed on the container. In such a case, the container corresponds to the virtual ECUs 5.

A plurality of virtual ECUs 5 are generated in the control unit 20 of the on-board ECU 2 started up using the virtualization operating system. In the control unit 20 in FIG. 3, three virtual ECUs 5, namely a first virtual ECU 51, a second virtual ECU 52, and a third virtual ECU 53, are generated. The control unit 20 is time-divided and periodically assigned to a virtual control unit 5*a* of the first virtual ECU 51, the virtual control unit 5*a* of the second virtual ECU 52, and the virtual control unit 5*a* of the third virtual ECU 53. In the example in FIG. 3, the first virtual ECU 51 is periodically generated in the first computation device 201. The virtual control unit 5*a* of the generated first virtual ECU 51 is assigned to the first computation device 201. In other words, the first computation device 201 functions as the first virtual ECU 51.

In the second computation device 202, the second virtual ECU 52 and the third virtual ECU 53 are periodically and alternately generated. The virtual control unit 5*a* of the generated second virtual ECU 52 is assigned to the second computation device 202. Also, the virtual control unit 5*a* of the generated third virtual ECU 53 is assigned to the second computation device 202. In other words, the second computation device 202 functions as the generated second virtual ECU 52. Also, the second computation device 202 functions as the generated third virtual ECU 53. Hereinafter, the fact that the virtual ECUs 5 are generated in the computation device 200 and the fact that the computation device 200 functions as the virtual ECUs 5 thus generated are also referred to as the fact that the computation device 200 generates the virtual ECUs 5.

The third computation device 203 executes a virtual ECU management program for managing all of the virtual ECUs 5. The third computation device 203 executes a virtual ECU management program, thereby functioning as a control panel for the virtualization operating system. In other words, the third computation device 203 executes the virtual ECU management program, thereby functioning as a management unit 1 that manages a plurality of virtual ECUs 5.

The management unit 1 references allocated time information stored in the storage unit 21, for example, and performs processing, which is so-called scheduling, to allocate the usage time of the first computation device 201 or the usage time of the second computation device 202 to the virtual ECUs 5. For example, the allocated time information includes the cycle in which the first virtual ECU 51 is generated and the time in which the first virtual ECU 51 is assigned. Also, the allocated time information includes the cycle in which the second virtual ECU 52 is generated, the time in which the second virtual ECU 52 is assigned, the cycle in which the third virtual ECU 53 is generated, and the time in which the third virtual ECU 53 is assigned. Hereinafter, the time in which each virtual ECU 5 is assigned is also referred to as the allocated time for the virtual ECU 5. For example, the time in which the first virtual ECU 51 is assigned is also referred to as the allocated time for the first virtual ECU 51.

The management unit 1 performs scheduling, and starts the operations of the first virtual ECU 51, the second virtual ECU 52, and the third virtual ECU 53. In other words, the management unit 1 performs the switching of the virtual ECU 5 for the first computation device 201 and the switching of the virtual ECU 5 for the second computation device 202, through the scheduling. The switching of the virtual ECU 5 includes the switching between an active state in which the virtual control unit 5*a* of the virtual ECU 5 is assigned to the computation device 200 and an inactive state in which the virtual control unit 5*a* of the virtual ECU 5 is not assigned to the computation device 200. Hereinafter, the transition of the virtual ECU 5 from the inactive state to the active state is referred to as activation. The transition of the virtual ECU 5 from the active state to the inactive state is referred to as inactivation.

The management unit 1 performs the switching of the virtual ECU 5 for the first computation device 201, thereby periodically generating (activating) the first virtual ECU 51 in the first computation device 201. Through the switching of the virtual ECU 5 for the first computation device 201, the first virtual ECU 51 is generated again in the first computation device 201. In addition, the first computation device 201 is assigned to the virtual control unit 5*a* of the above first virtual ECU 51 generated again. In other words, through the switching of the virtual ECU 5 for the first computation device 201, the first virtual ECU 51 is inactivated, and is thereafter activated.

The management unit 1 performs the switching of the virtual ECU 5 for the second computation device 202, thereby periodically and alternately generating the second virtual ECU 52 and the third virtual ECU 53 in the second computation device 202. Through the switching of the virtual ECU 5 for the second computation device 202, the virtual ECU 5 generated in the second computation device 202 is switched from either one of the second virtual ECU 52 and the third virtual ECU 53 to the other of the second virtual ECU 52 and the third virtual ECU 53. In the second computation device 202, the other of the second virtual ECU 52 and the third virtual ECU 53 is generated. The second computation device 202 is assigned to the virtual control unit 5*a* of the other of the second virtual ECU 52 and the third virtual ECU 53. In other words, through the switching of the virtual ECU 5 for the second computation device 202, one of the second virtual ECU 52 and the third virtual ECU 53 is inactivated. The other of the second virtual ECU 52 and the third virtual ECU 53 is inactivated.

The area of the storage unit 21 is divided into areas, which are assigned to communication buffers 6 that include a first communication buffer 61, a second communication buffer 62, and a third communication buffer 63. The communication buffers 6 are included in the virtual ECUs 5. Specifically, the first communication buffer 61 is included in the first virtual ECU 51. The first communication buffer 61 includes a first transmission buffer 61*a* and a first reception buffer 61*b*. Communication data to be transmitted to another virtual ECU 5 when the first virtual ECU 51 communicates with the other virtual ECU 5 is written to the first transmission buffer 61*a*. Communication data from another virtual ECU 5 to be received by the first virtual ECU 51 is written to the first reception buffer 61*b*.

The second communication buffer 62 is included in the second virtual ECU 52. The second communication buffer 62 includes a second transmission buffer 62*a* and a second reception buffer 62*b*. Communication data to be transmitted to another virtual ECU 5 when the second virtual ECU 52 communicates with the other virtual ECU 5 is written to the second transmission buffer 62*a*. Communication data from another virtual ECU 5 to be received by the second virtual ECU 52 is written to the second reception buffer 62*b*.

The third communication buffer 63 is included in the third virtual ECU 53. The third communication buffer 63 includes a third transmission buffer 63*a* and a third reception buffer 63*b*. Communication data to be transmitted to another virtual ECU 5 when the third virtual ECU 53 communicates with the other virtual ECU 5 is written to the third transmission buffer 63*a*. Communication data from another virtual ECU 5 to be received by the third virtual ECU 53 is written to the third reception buffer 63*b*.

The first transmission buffer 61*a*, the second transmission buffer 62*a*, and the third transmission buffer 63*a* are included in the transmission buffers. Hereinafter, the first transmission buffer 61*a*, the second transmission buffer 62*a*, and the third transmission buffer 63*a* are collectively referred to as transmission buffers 6*a*. The first reception buffer 61*b*, the second reception buffer 62*b*, and the third reception buffer 63*b* are included in the reception buffers. Hereinafter, the first reception buffer 61*b*, the second reception buffer 62*b*, and the third reception buffer 63*b* are collectively referred to as reception buffers 6*b*.

Even after the generation of the virtual ECUs 5 is complete, information written to the virtual storage units and communication buffers 6 of the virtual ECUs 5, for example, communication data, is held in the virtual storage units and communication buffers of the above virtual ECUs 5 assigned in the storage unit 21. Cases in which the generation of the virtual ECUs 5 is complete include a case in which the virtual ECUs 5 are in an inactive state.

For each of the transmission buffers 6*a*, a transmission buffer update flag indicating that communication data to be written to the transmission buffer 6*a* has been updated is provided for each communication data identifier, such as message IDs. Note that the communication data identifier is not limited to a message ID, but may be information regarding a port number included in the communication data, or an IP address, for example.

FIG. 4 is a schematic diagram illustrating a configuration of the transmission buffer 6*a*. In the transmission buffer 6*a*, an area for storing communication data, the identifier of the communication data, the data length of the communication data, and the transmission buffer update flag of the communication data in association with each other is provided for each identifier. The transmission buffer 6*a* in FIG. 4 can distinguishably store a plurality of pieces of communication data.

When a virtual ECU 5 is to communicate with other virtual ECUs 5, the virtual ECU 5 writes the communication data to be transmitted to the other virtual ECUs 5 in the virtual ECU's own transmission buffer 6*a*. When the virtual ECU 5 writes new communication data to the transmission buffer 6*a*, the virtual ECU 5 overwrites the communication data associated with the same identifier as the identifier of the new communication data in the transmission buffer 6*a*, with the new communication data. In other words, in the transmission buffer 6*a*, the communication data with the above identifier is updated.

The transmission buffer update flag can be OFF or ON. If the transmission buffer update flag is OFF, the communication data in the transmission buffer 6*a* has not been updated. If the transmission buffer update flag is ON, the communication data in the transmission buffer 6*a* has been updated, and therefore, in the transmission buffer 6*a*, the communication data whose transmission buffer update flag is ON is communication data newly written to the transmission buffer 6*a*.

After writing communication data, the virtual ECU 5 turns on the transmission buffer update flag of the communication data. Note that the number of pieces of communication data to be written by the virtual ECU 5 to the transmission buffer 6*a* may be one piece or a plurality of pieces. If the virtual ECU 5 writes a plurality of pieces of communication data to the transmission buffer 6*a*, the virtual ECU 5 turns on the transmission buffer update flag of each of the plurality of pieces of communication data.

For example, the first virtual ECU 51 writes communication data that is to be transmitted to at least one of the second virtual ECU 52 and the third virtual ECU 53, to the first transmission buffer 61*a*. After writing communication data to the first transmission buffer 61*a*, the first virtual ECU 51 turns on the transmission buffer update flag of the communication data in the first transmission buffer 61*a*. As with the first virtual ECU 51, the second virtual ECU 52 writes communication data to the second transmission buffer 62*a*. After writing communication data, the second virtual ECU 52 turns on the transmission buffer update flag of the communication data in the second transmission buffer 62*a*. The third virtual ECU 53 writes communication data to the third transmission buffer 63*a*. After writing communication data, the third virtual ECU 53 turns on the transmission buffer update flag of the communication data in the third transmission buffer 63*a*.

For each of the reception buffers 6*b*, a reception buffer update flag indicating that communication data to be written to the reception buffer 6*b* has been updated is provided for each communication data identifier. FIG. 5 is a schematic diagram illustrating a configuration of the reception buffer 6*b*. In the reception buffer 6*b*, an area for storing communication data, the identifier of the communication data, the data length of the communication data, and the reception buffer update flag of the communication data in association with each other is provided for each identifier. The reception buffer 6*b* in FIG. 5 can distinguishably store a plurality of pieces of communication data. As described in detail below, the management unit 1 writes communication data to the reception buffer. When writing new communication data to the reception buffer 6*b*, the management unit 1 overwrites the communication data associated with the same identifier as the identifier of the new communication data in the reception buffer 6*b*, with the new communication data. In other words, in the reception buffer 6*b*, the communication data with the above identifier is updated.

The reception buffer update flag can be OFF or ON. If the reception buffer update flag is OFF, the communication data in the reception buffer 6*b* has not been updated. If the reception buffer update flag is ON, the communication data in the reception buffer 6*b* has been updated, and therefore, in the reception buffer 6*b*, the communication data whose reception buffer update flag is ON is communication data newly written to the reception buffer 6*b*.

If the reception buffer update flag in the reception buffer 6*b* of the virtual ECU 5 is ON, the virtual ECU 5 reads out the update communication data from the reception buffer 6*b*. Specifically, "if the reception buffer update flag is ON" means "if at least one of the reception buffer update flags associated with the pieces of communication data written to the reception buffers 6*b* is ON". In this case, the virtual ECU 5 reads out the communication data whose reception buffer update flag is ON in the virtual ECU's own reception buffer 6*b*. For example, the reception buffer update flags of a plurality of pieces of communication data are ON, the virtual ECU 5 reads out the plurality of pieces of communication data. After reading out the communication data, the virtual ECU 5 switches the reception buffer update flag of the communication data from ON to OFF. The virtual ECU 5 executes the program, using the communication data thus read out.

For example, if the reception buffer update flag in the first reception buffer 61*b* is ON, the first virtual ECU 51 reads out the updated communication data from the first reception buffer 61*b*. After reading out the communication data, the first virtual ECU 51 turns off the reception buffer update flag for the first reception buffer 61*b*. If the reception buffer update flag in the second reception buffer 62*b* is ON, the second virtual ECU 52 reads out the updated communication data from the second reception buffer 62*b*. After reading out the communication data, the second virtual ECU 52 turns off the reception buffer update flag for the second reception buffer 62*b*. If the reception buffer update flag in the third reception buffer 63*b* is ON, the third virtual ECU 53 reads out the updated communication data from the third reception buffer 63*b*. After reading out the communication data, the third virtual ECU 53 turns off the reception buffer update flag for the third reception buffer 63*b*.

As shown in FIG. 3, the storage unit 21 includes a storage area 210 that can be accessed only by the management unit 1 of the first virtual ECU 51, the second virtual ECU 52, the third virtual ECU 53, and the management unit 1. The storage area 210 is provided with a storage area update flag indicating that the communication data to be written to the storage area 210 has been updated, for each communication data identifier. As described in detail below, the management unit 1 writes the communication data written to the transmission buffer 6*a*, to the storage area 210, and temporarily stores the communication data in the storage area 210. For example, communication data is written to the storage area 210 in association with the identifier of the communication data, the data length of the communication data, and the storage area update flag of the communication data. The storage area 210 stores one or more pieces of communication data so as to be distinguishable from each other. When new communication data is to be written to the storage area 210, and communication data associated with the same identifier as the identifier of the new communication data is stored in the storage area 210, the management unit 1 overwrites the communication data with the new communication data. In other words, in the storage area 210, the communication data with the above identifier is updated.

The storage area update flag can be OFF or ON. If the storage area update flag is OFF, the communication data in the storage area 210 has not been updated. If the storage area update flag is ON, the communication data in the storage area 210 has been updated, and therefore, in the storage area 210, the communication data whose storage area update flag is ON is communication data newly written to the storage area 210.

If the transmission buffer update flag in the transmission buffer 6*a* of one virtual ECU 5 of the three virtual ECUs 5 is ON, the management unit 1 reads out the updated communication data from the transmission buffer 6*a*. Specifically, "if the above transmission buffer update flag is ON" means "if at least one of the transmission buffer update flags associated with the pieces of communication data written to the above transmission buffers 6*a* is ON". If the transmission buffer update flag is ON, the management unit 1 reads out communication data whose transmission buffer update flag is ON, from the transmission buffer 6*a* of one virtual ECU 5. The management unit 1 writes the communication data thus read out, to the storage area 210. As described in detail below, the virtual ECU 5 reads out communication data from the transmission buffer 6*a* during a period in which the virtual control unit 5*a* of the above virtual ECU 5 is not assigned to the computation device 200, i.e., during a period in which the virtual control units 5*a* of the above virtual ECUs 5 are not assigned to the control unit 20. Hereinafter, a period in which the virtual control units 5*a* of the virtual ECUs 5 are not assigned to the control unit 20 is also referred to as a period in which the virtual ECUs 5 are not assigned to the control unit 20. The period in which the virtual ECUs 5 are not assigned to the control unit 20 is a period in which the virtual ECUs 5 are in an inactive state. The period in which the virtual ECUs 5 are not assigned to the control unit 20 corresponds to a period in which the virtual ECUs 5 are not operating.

After writing the communication data to the storage area 210, the management unit 1 switches the transmission buffer update flag of the communication data from ON to OFF in the transmission buffer 6*a* of one virtual ECU 5. Furthermore, the management unit 1 turns on the storage area update flag of the above communication data in the storage area 210.

For example, during a period in which the virtual control unit 5*a* of the first virtual ECU 51 is not assigned to the first computation device 201, the management unit 1 determines whether or not the transmission buffer update flag for the first transmission buffer 61*a* is ON. If the above transmission buffer update flag is ON, the management unit 1 reads out communication data whose transmission buffer update flag is ON, from the first transmission buffer 61*a*. The management unit 1 turns off the transmission buffer update flag. The management unit 1 writes the communication data thus read out, to the storage area 210. The management unit 1 turns on the storage area update flag of the written communication data.

The management unit 1 writes, from among the pieces of communication data written to the storage area 210, a piece of communication data whose storage area update flag is ON and whose transmission destination is the virtual ECU 5 that is to start operation next, to the reception buffer 6*b* of the virtual ECU 5 that is to start operation next. The piece of communication data written to the transmission buffer 6*a* of the transmission source virtual ECU 5 is written to the reception buffer 6*b* of the transmission destination virtual ECU 5, via the storage area 210. For example, the management unit 1 determines the transmission destination virtual ECU 5 based on information regarding the transmission destination of the communication data. For example, information regarding the transmission destination may be included in communication data, or stored in the storage unit 21 in advance. As described in detail below, the management unit 1 writes communication data to the reception buffer 6*b* during a period in which the virtual ECUs 5 are not assigned to the control unit 20.

After writing communication data to the reception buffer 6*b*, the management unit 1 turns on the reception buffer update flag of the communication data written to the reception buffers 6*b*. Furthermore, the management unit 1 turns off the storage area update flag of the above communication data in the storage area 210. For example, if the plurality of virtual ECUs 5 are the transmission destinations of communication data, the management unit 1 writes the communication data to all of the reception buffers 6*b* of the transmission destination virtual ECUs 5, and thereafter turns off the storage area update flag of the communication data off. Each of the transmission destination virtual ECUs 5 reads out the communication data written to the virtual ECU's own reception buffer 6*b*, based on the reception buffer update flag, as described above.

For example, when the management unit 1 is to start the operation of the first virtual ECU 51, the management unit 1 determines whether or not the storage area update flag is ON, before starting the operation of the first virtual ECU 51. "If the storage area update flag is ON" means "if at least one of the storage area update flags of the pieces of communication data written to the storage area 210 is ON". If the storage area update flag is ON, the management unit 1 writes a piece of communication data whose storage area update flag is ON and whose transmission destination is the first virtual ECU 51, to the first reception buffer 61*b*. After writing the piece of communication data to the first reception buffer 61*b*, the management unit 1 turns on the reception buffer update flag of the piece of communication data written to the reception buffer 61*b*. In addition, the management unit 1 turns off the storage area update flag of the above communication data in the storage area 210.

For example, the management unit 1 may write the piece of communication data whose storage area update flag is ON to the reception buffers 6*b* of all the virtual ECUs 5 other than the transmission source virtual ECU 5 of the piece of communication data. That is to say, the management unit 1 may write the communication data whose storage area update flag is ON to the reception buffer 6*b* of the virtual ECU 5 to operate next, without considering the transmission destination of the communication data. In this case, when the management unit 1 writes the communication data to the reception buffers 6*b* of all the virtual ECU 5 other than the transmission source virtual ECU 5 of the communication data, the management unit 1 brings the storage area update flag into an OFF state from an ON state. When reading out the communication data written in the reception buffer 6*b*, each virtual ECU 5 determines whether or not the communication data is to be received by the virtual ECU itself. When the communication data is to be received by the virtual ECU 5 itself, the virtual ECU 5 acquires the communication data from the reception buffer 6*b*. For example, when the communication data is not to be received by the virtual ECU 5 itself, the virtual ECU 5 discards the communication data. For example, the reception buffer 6*b* may be configured so that only a massage that is to be received by the virtual ECU 5 that includes the reception buffer 6*b* is to be written thereto.

Figure 6:
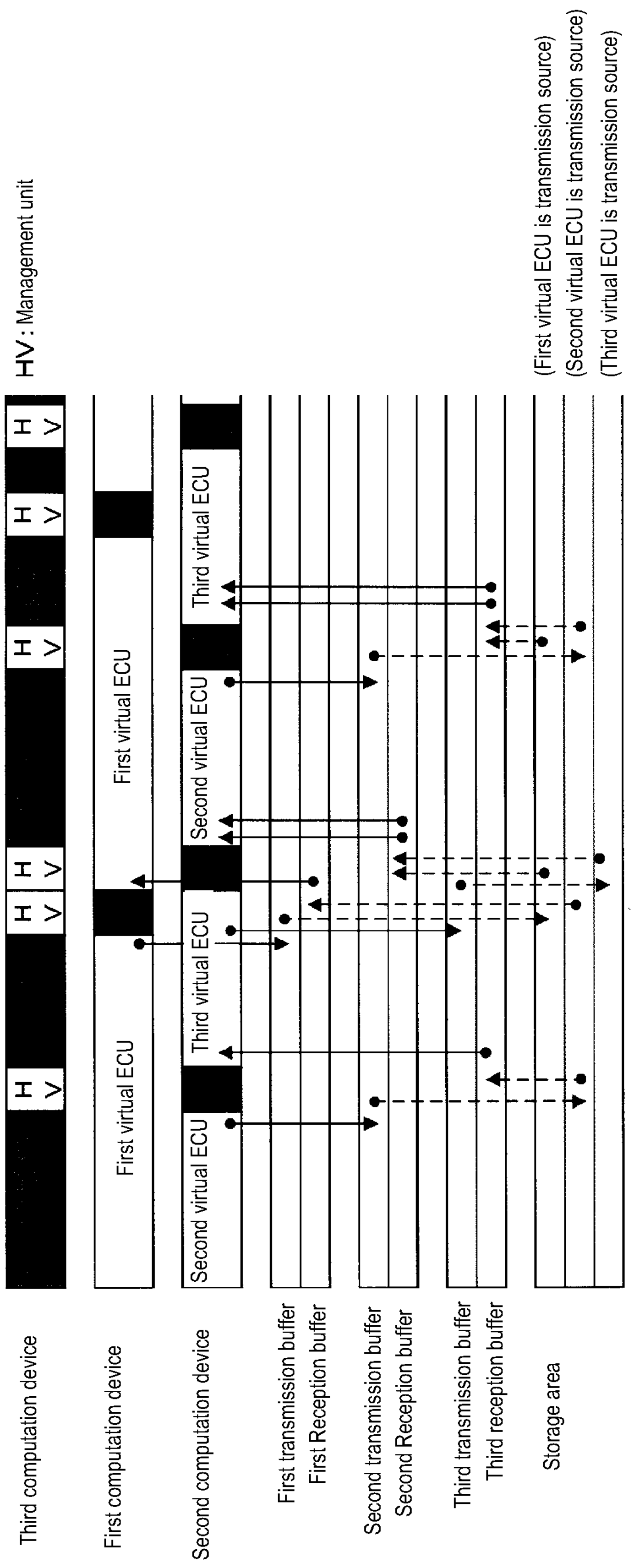
FIG. 6 is an illustration of an example of communication between a plurality of virtual ECUs.

FIG. 6 is an illustration of an example of communication between a plurality of virtual ECUs 5. In the example in FIG. 6, the transmission destinations of the communication data are all the virtual ECUs 5 other than the transmission source. As described above, the third computation device 203 functions as a management unit 1. In FIG. 6, the management unit 1 is denoted as HV (Hypervisor). As described above, the management unit 1 periodically causes the first computation device 201 to generate the first virtual ECU 51, and assigns the virtual control unit 5*a* of the first virtual ECU 51 thus generated, to the first computation device 201. A predetermined interval is provided between the period in which the first virtual ECU 51 is generated and the period in which the first virtual ECU 51 is generated again.

As described above, the management unit 1 periodically causes the second computation device 202 to alternately generate the second virtual ECU 52 and the third virtual ECU 53, and assigns the virtual control unit 5*a* of the second virtual ECU 52 or the third virtual ECU 53 thus generated, to the second computation device 202. A predetermined interval is provided between the period in which the second virtual ECU 52 is generated and the period in which the third virtual ECU 53. The predetermined period related to the first virtual ECU 51 and the predetermined period related to the second virtual ECU 52 and the third virtual ECU 53 may be the same periods or different periods. In FIG. 6, the period in which the first virtual ECU 51 is generated is longer than the period in which the second virtual ECU 52 is generated and the period in which the third virtual ECU 53 is generated.

In FIG. 6, the management unit 1 causes the first computation device 201 to start the generation of the first virtual ECU 51, and causes the second computation device 202 to start the generation of the second virtual ECU 52. Starting the generation of the virtual ECU 5 includes the activation of the virtual ECU 5. The second virtual ECU 52 writes communication data to the second transmission buffer 62*a*, and turns on the transmission buffer update flag for the second transmission buffer 62*a* as described above. In FIG. 6, the solid arrows indicate the writing or reading out of communication data by the virtual ECU 5. The dotted arrows indicate the writing or reading out of communication data by the management unit 1. The management unit 1 causes the second computation device 202 to terminate the generation of the second virtual ECU 52, and causes the second computation device 202 to start the generation of the third virtual ECU 53. In other words, the management unit 1 performs the switching of the virtual ECU 5 for the second computation device 202. The termination of the generation of the virtual ECU 5 includes the inactivation of the virtual ECU 5.

The management unit 1 performs the following processing during the period from when the second computation device 202 terminates the generation of the second virtual ECU 52 to when the second computation device 202 starts the generation of the third virtual ECU 53. As described above, based on the transmission buffer update flag, the management unit 1 reads out communication data whose transmission buffer update flag for the second transmission buffer 62*a* is ON from the second transmission buffer 62*a*, and writes the communication data to the storage area 210. As described above, the management unit 1 switches the transmission buffer update flag of the communication data read out from the second transmission buffer 62*a* from ON to OFF, and turns on the storage area update flag of the communication data written to the storage area 210. Regarding the storage area 210 in FIG. 6, the storage area 210 is shown for each transmission source of communication data for the purpose of illustration.

The virtual ECU 5 to be activated next by the management unit 1 is the third virtual ECU 53, and therefore, as described above, based on the storage area update flag, the management unit 1 reads out communication data whose storage area update flag is ON from the storage area 210, and writes the communication data to the third reception buffer 63*b*. In the example in FIG. 6, the communication data transmitted from the second virtual ECU 52 is written to the third reception buffer 63*b*. As described above, the management unit 1 turns on the reception buffer update flag of the communication data written to the third reception buffer 63*b*. The period from when the second computation device 202 terminates the generation of the second virtual ECU 52 to when the second computation device 202 starts the generation of the third virtual ECU 53 is included in the period in which the virtual control units 5*a* of the virtual ECUs 5 are not assigned to the control unit 20.

Based on the reception buffer update flag, the third virtual ECU 53 generated by the second computation device 202 reads out communication data whose reception buffer update flag for the third reception buffer 63*b* is ON, from the third reception buffer 63*b*, as described above. In the example in FIG. 6, the third virtual ECU 53 reads out communication data transmitted from the second virtual ECU 52. The communication data is exchanged between the third virtual ECU 53 and the second virtual ECU 52 via the storage area 210. That is to say, communication is performed between the third virtual ECU 53 and the second virtual ECU 52. The third virtual ECU 53 switches the reception buffer update flag of the communication data thus read out, from ON to OFF.

The first virtual ECU 51 writes communication data to the first transmission buffer 61*a*, and turns on the transmission buffer update flag for the first transmission buffer 61*a* as described above. The management unit 1 causes the first computation device 201 to terminate the generation of the first virtual ECU 51, and causes the first computation device 201 to start the generation of the first virtual ECU 51 again. In other words, the management unit 1 performs the switching of the virtual ECU 5 for the second computation device 202.

The management unit 1 performs the following processing during the period from when the first computation device 201 terminates the generation of the first virtual ECU 51 to when the first computation device 201 starts the generation of the first virtual ECU 51 again. As described above, based on the transmission buffer update flag, the management unit 1 reads out communication data whose transmission buffer update flag for the first transmission buffer 61*a* is ON from the first transmission buffer 61*a*, and writes the communication data to the storage area 210. As described above, the management unit 1 switches the transmission buffer update flag of the communication data read out from the first transmission buffer from ON to OFF, and turns on the storage area update flag of the communication data written to the storage area 210.

The virtual ECU 5 to be activated next by the management unit 1 is the first virtual ECU 51, and therefore, as described above, based on the storage area update flag, the management unit 1 reads out communication data whose storage area update flag is ON from the storage area 210, and writes the communication data to the first reception buffer 61*b*. In the example in FIG. 6, the communication data transmitted from the second virtual ECU 52 is written to the first reception buffer 61*b*. The management unit 1 turns on the reception buffer update flag of the communication data written to the first reception buffer 61*b*. In the example in FIG. 6, the transmission destinations of the communication data are all the virtual ECUs 5 other than the transmission source. The communication data transmitted from the second virtual ECU 52 has been written to the first reception buffer 61*b* and the third reception buffer 63*b*, and therefore, in the storage area 210, the management unit 1 turns off the storage area update flag of the communication data transmitted from the second virtual ECU 52. The period from when the first computation device 201 terminates the generation of the first virtual ECU 51 to when the first computation device 201 starts the generation of the first virtual ECU 51 again is included in the period in which the virtual control units 5*a* of the virtual ECUs 5 are not assigned to the control unit 20.

The first virtual ECU 51 generated in the first computation device 201 again reads out the communication data whose reception buffer update flag for the first reception buffer 61*b* is ON from the first reception buffer 61*b*, based on the reception buffer update flag, and acquires the communication data, as described above. The first virtual ECU 51 switches the reception buffer update flag of the communication data read out from the first reception buffer 61*b*, from ON to OFF.

In the example in FIG. 6, in the period from when the first computation device 201 terminates the generation of the first virtual ECU 51 to when the first computation device 201 starts the generation of the first virtual ECU 51 again, the third virtual ECU 53 writes the communication data to the third transmission buffer 63*a*, and turns on the transmission buffer update flag of the communication data written to the third transmission buffer 63*a*.

The management unit 1 causes the second computation device 202 to terminate the generation of the third virtual ECU 53, and causes the second computation device 202 to start the generation of the second virtual ECU 52. In other words, the management unit 1 performs the switching of the virtual ECU 5 for the second computation device 202. The management unit 1 performs the following processing during the period from when the second computation device 202 terminates the generation of the third virtual ECU 53 to when the second computation device 202 starts the generation of the second virtual ECU 52. As described above, based on the transmission buffer update flag, the management unit 1 reads out communication data whose transmission buffer update flag for the third transmission buffer 63*a* is ON from the third transmission buffer 63*a*, and writes the communication data to the storage area 210. As described above, the management unit 1 switches the transmission buffer update flag of the communication data thus read out from ON to OFF, and turns on the storage area update flag of the written communication data.

The virtual ECU 5 to be activated next by the management unit 1 is the second virtual ECU 52, and therefore, as described above, based on the storage area update flag, the management unit 1 reads out communication data whose storage area update flag is ON from the storage area 210, and writes the communication data to the second reception buffer 62*b*. In the example in FIG. 6, the communication data transmitted from the first virtual ECU 51 and the communication data transmitted from the third virtual ECU 53 are written to the second reception buffer 62*b*. The period from when the second computation device 202 terminates the generation of the third virtual ECU 53 to when the second computation device 202 starts the generation of the second virtual ECU 52 is included in the period in which the virtual control units 5*a* of the virtual ECUs 5 are not assigned to the control unit 20.

Based on the reception buffer update flag, the second virtual ECU 52 generated by the second computation device 202 reads out communication data whose reception buffer update flag for the second reception buffer 62*b* is ON, from the second reception buffer 62*b*, as described above. In the example in FIG. 6, the second virtual ECU 52 reads out two pieces of communication data, and turns off the reception buffer update flags of the two pieces of communication data read out from the second reception buffer 62*b*. The second virtual ECU 52 writes new piece of communication data to the second transmission buffer 62*a*, and turns on the transmission buffer update flag for the second transmission buffer 62*a* as described above. The management unit 1 performs the switching of the virtual ECU 5 for the second computation device 202.

The management unit 1 performs the following processing during the period from when the generation of the second virtual ECU 52 is terminated to when the generation of the third virtual ECU 53 is started. The management unit 1 writes communication data whose transmission buffer update flag for the second transmission buffer 62*a* is ON in the second transmission buffer 62*a* to the storage area 210. As described above, the management unit 1 switches the above transmission buffer update flag from ON to OFF, and turns on the storage area update flag of the written communication data.

Furthermore, the management unit 1 reads out communication data whose storage area update flag is ON, from the storage area 210, and writes the communication data to the third reception buffer 63*b*. In the example in FIG. 6, the communication data transmitted from the first virtual ECU 51 and the communication data transmitted from the second virtual ECU 52 are written to the third reception buffer 63*b*. The communication data transmitted from the first virtual ECU 51 has been written to the second reception buffer 62*b* and the third reception buffer 63*b*, and therefore, in the storage area 210, the management unit 1 turns off the storage area update flag of the communication data transmitted from the first virtual ECU 51.

Based on the reception buffer update flag, the generated third virtual ECU 53 reads out communication data whose reception buffer update flag for the third reception buffer 63*b* is ON, from the third transmission buffer 63*a*. The third virtual ECU 53 turns off the reception buffer update flag of the communication data read out from the third reception buffer 63*b*.

As described above, the reading out and writing of communication data is performed based on the update flags including the transmission buffer update flag, the storage area update flag, and the reception buffer update flag. Also, the update flags are set in response to the reading out and writing of communication data.

Figure 7:
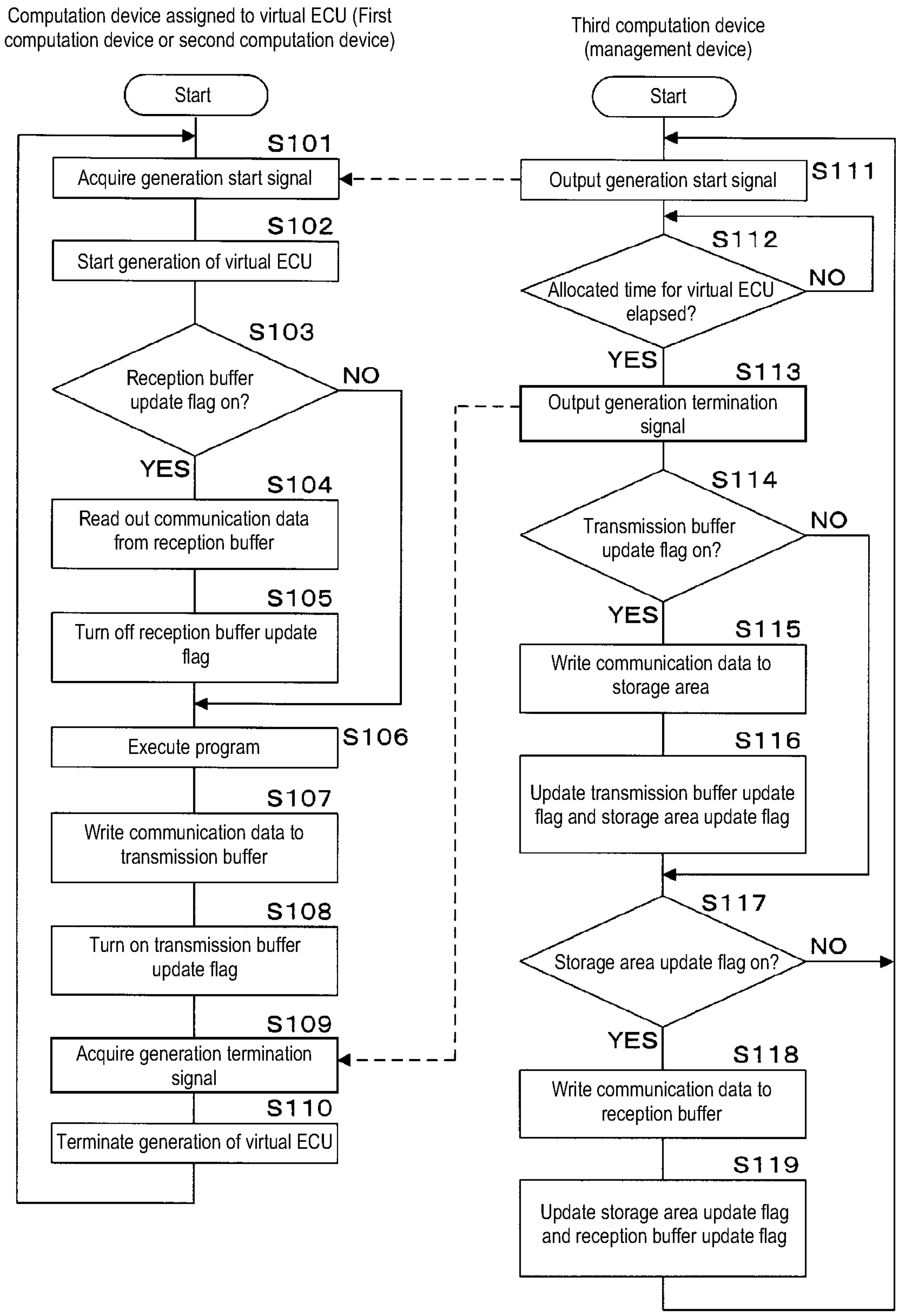
FIG. 7 is a flowchart illustrating processing performed by a third computing device, which functions as a management unit, and processing related to virtual ECU generation performed by a computing device to be assigned to a virtual ECU.

FIG. 7 is a flowchart illustrating the processing performed by the third computation device 203 functioning as the management unit 1, and the processing related to the generation of a virtual ECU 5 performed by a computation device 200 assigned to the virtual ECU 5. In the present embodiment, the computation device 200 assigned to the virtual ECU 5 is the first computation device 201 or the second computation device 202. For example, when an IG (ignition) switch (not shown) of the vehicle C transitions from OFF to ON, the third computation device 203 performs the following processing as the management unit 1. Also, when the IG switch transitions from OFF to ON, the computation device 200 assigned to the virtual ECU 5 performs the following processing. Hereinafter, step is abbreviated as S.

The computation device 200 assigned to the virtual ECU 5 acquires a generation start signal indicating the generation start of the virtual ECU 5 from the third computation device 203 (S101), and starts the generation of the virtual ECU 5 (S102). Specifically, the first computation device 201, which is an instance of the above computation device 200, generates the first virtual ECU 51. The second computation device 202 generates either the second virtual ECU 52 or the third virtual ECU 53.

The computation device 200 assigned to the virtual ECU 5 determines whether or not the reception buffer update flag for the reception buffer 6*b* of the generated virtual ECU 5 is ON (S103). If the reception buffer update flag is not ON (S103: NO), i.e., if the above reception buffer update flag is OFF, the computation device 200 assigned to the virtual ECU 5 performs S106 described below. "If the above reception buffer update flag is not ON" means "if all the reception buffer update flags associated with the pieces of communication data written to the reception buffers 6*b* of the generated virtual ECUs 5 are OFF".

If the reception buffer update flag is ON (S103: YES), the computation device 200 assigned to the virtual ECU 5 reads out communication data whose reception buffer update flag is ON, from the above reception buffer 6*b*, as described above (S104). "If the above reception buffer update flag is ON" means "if at least one of the reception buffer update flags associated with the pieces of communication data written to the reception buffers 6*b* of the generated virtual ECUs 5 is ON". The computation device 200 assigned to the virtual ECU 5 turns off the reception buffer update flag of the communication data thus read out as described above (S105). The computation device 200 assigned to the virtual ECU 5 executes a program (S106). Note that the program is executed on the virtual ECU 5. For example, when reading out communication data from the reception buffer 6*b* through the processing in S104, the computation device 200 assigned to the virtual ECU 5 executes the program using the communication data thus read out.

The computation device 200 assigned to the virtual ECU 5 writes the communication data to the transmission buffer 6*a* of the generated virtual ECU 5 (S107). After writing the communication data to the transmission buffer 6*a*, the above computation device 200 turns on the transmission buffer update flag of the written communication data as described above (S108). The computation device 200 assigned to the virtual ECU 5 acquires a generation termination signal indicating the generation termination of the virtual ECU 5 from the third computation device 203 (S109), and terminates the generation of the virtual ECU 5 (S110). The computation device 200 assigned to the virtual ECU 5 performs the processing in S101. The virtual ECU 5 to be generated is switched. Specifically, the first computation device 201, which is an instance of the above computation device 200, terminates the generation of the first virtual ECU 51, and starts the generation of the first virtual ECU 51 again. The second computation device 202 terminates the generation of one of the second virtual ECU 52 and the third virtual ECU 53, and starts the generation of the other of the second virtual ECU 52 and the third virtual ECU 53. The computation device 200 assigned to the virtual ECU 5 terminates the processing when the IG switch transitions from ON to OFF, for example.

The third computation device 203 outputs the generation start signal to the computation device 200 assigned to the virtual ECU 5, based on the above allocated time information (S111). The third computation device 203 causes the first computation device 201 to start the generation of the first virtual ECU 51. Alternatively, the third computation device 203 causes the second computation device 202 to start the generation of one of the second virtual ECU 52 and the third virtual ECU 53.

The third computation device 203 determines whether or not the time allocated to the virtual ECU 5 has elapsed from when the computation device 200 assigned to the virtual ECU 5 started the generation of the virtual ECU 5 (S112). For example, in the case where the third computation device 203 causes the first computation device 201 to start the generation of the first virtual ECU 51, the third computation device 203 determines whether or not the time allocated to the first virtual ECU 51 has elapsed from when the first computation device 201 started the generation of the first virtual ECU 51.

If the allocated time for the virtual ECU 5 has not elapsed (S112: NO), the third computation device 203 performs loop processing to perform the processing in S112 again. If the allocated time for the virtual ECU 5 has elapsed (S112: YES), the third computation device 203 outputs a generation termination signal to the computation device 200 assigned to the virtual ECU 5, based on the allocated time information (S113), and causes the first computation device 201 or the second computation device 202 to terminate the generation of the virtual ECU 5.

Instead of the processing in S112, the third computation device 203 may perform wait processing from when the third computation device 203 causes the computation device 200 assigned to the virtual ECU 5 to start the generation of the virtual ECU 5 to when the allocated time for the virtual ECU 5 elapses. After the wait processing, the third computation device 203 performs the processing in S113.

The third computation device 203 determines whether or not the transmission buffer update flag is ON in the transmission buffer 6*a* of the above virtual ECU 5 that has stopped the generation (S114). If the above transmission buffer update flag is not ON (S114: NO), the processing in S117 described below is performed. "If the transmission buffer update flag is not ON" means "if all the transmission buffer update flags associated with the pieces of communication data written to the reception buffers 6*a* of the virtual ECUs 5 are OFF".

If the transmission buffer update flag is ON (S114: YES), the third computation device 203 reads out communication data whose transmission buffer update flag is ON from the above transmission buffer 6*a* and writes the communication data to the storage area 210 (S115), as described above. "If the above transmission buffer update flag is ON" means "if at least one of the transmission buffer update flags associated with the pieces of communication data written to the above transmission buffers 6*a* is ON". As described above, after writing the communication data to the storage area 210, the third computation device 203 switches the transmission buffer update flag of the communication data read out from the transmission buffer 6*a* from ON to OFF, and turns on the storage area update flag of the communication data written to the storage area 210. That is to say, the third computation device 203 updates the transmission buffer update flag and the storage area update flag (S116).

The third computation device 203 determines whether or not the storage area update flag is ON (S117). If the storage area update flag is ON (S117: YES), the third computation device 203 performs the following processing. As described above, the third computation device 203 reads out, from among the pieces of communication data written to the storage area 210, a piece of communication data whose storage area update flag is ON and whose transmission destination is the virtual ECU 5 to operate next, from the storage area 210. The third computation device 203 writes the communication data read out from the storage area 210, to the reception buffer 6*b* of the virtual ECU 5 that is to start operation next (S118). "If the above storage area update flag is ON" means "if at least one of the storage area update flags of the pieces of communication data written to the storage area 210 is ON". Note that the third computation device 203 may write the communication data whose storage area update flag is ON to the reception buffer 6*b* of the virtual ECU 5 to operate next, without considering the transmission destination of the communication data, as described above.

After writing the communication data to the reception buffer 6*b*, the third computation device 203 switches the storage area update flag of the communication data read out from the storage area 210 from ON to OFF, as described above. Furthermore, the third computation device 203 turns on the reception buffer update flag of the communication data written to the reception buffer 6*b*. That is to say, the third computation device 203 updates the storage area update flag and the reception buffer update flag (S119). For example, if there are a plurality of transmission destinations of communication data, the third computation device 203, after writing the pieces of communication data to the reception buffers 6*b* of all the transmission destination virtual ECUs 5, switches the storage area update flags of the pieces of communication data from ON to OFF.

The third computation device 203 performs the processing in S111 to switch the virtual ECU 5 for the first computation device 201 or the second computation device 202. Specifically, the third computation device 203 causes the first computation device 201 to start the generation of the first virtual ECU 51 again. Alternatively, the third computation device 203 causes the second computation device 202 to start the generation of the other of the second virtual ECU 52 and the third virtual ECU 53. The third computation device 203 terminates the processing when the IG switch transitions from ON to OFF, for example.

If the storage area update flag is not ON (S117: NO), the third computation device 203 performs the processing in S111, and performs the switching of the virtual ECU 5 for the first computation device 201 or the second computation device 202. "If the above storage area update flag is not ON" means "if all the storage area update flags of the pieces of communication data written to the storage area 210 are OFF".

In the present embodiment, a plurality of virtual ECUs 5 are generated in each on-board ECU 2. The third computation device 203 of the first computation device 201, the second computation device 202, and the third computation device 203 included in the control unit 20 functions as the management unit 1. The virtual control units 5*a* of the virtual ECUs 5 are respectively assigned to the first computation device 201 and the second computation device 202. The first computation device 201 and the second computation device 202 each function as a virtual ECU 5. Each virtual ECU 5 writes and reads out communication data to and from the virtual ECU's own communication buffers 6. The management unit 1 reads out the communication data written to the transmission buffer 6*a*, and writes the communication data to the storage area 210. The management unit 1 writes the communication data written to the storage area 210 to the reception buffer 6*b* of the transmission destination virtual ECU 5. Communication data is exchanged between a plurality of virtual ECUs 5 via the storage area 210. That is to say, the plurality of virtual ECUs 5 communicate with each other via the storage area 210. Only the management unit 1 can access the storage area 210, and therefore it is possible to prevent the virtual ECUs 5 from erroneously writing or reading out communication data to and from the storage area 210.

Communication data is exchanged by the management unit 1 via the storage area 210. Therefore, while one virtual ECU 5 is writing communication data, the other virtual ECUs 5 will not read out the communication data. As described above, the management unit 1 writes and reads out communication data while the virtual control unit 5*a* is not assigned to the first computation device 201 or the second computation device 202, and therefore the writing of communication data by the virtual ECU 5, to the communication buffer 6, and the reading of communication data by the management unit 1, from the communication buffer 6, do not conflict with each other. Also, the writing of communication data by the management unit 1, to the communication buffer 6, and the reading of communication data by the virtual ECU 5, from the communication buffer 6, do not conflict with each other. Specifically, it is possible to prevent the writing and reading out of communication data to and from the transmission buffers 6*a* from conflicting with each other. In addition, it is possible to prevent the writing and reading out of communication data to and from the reception buffers 6*b* from conflicting with each other. Therefore, communication data can be appropriately exchanged between the plurality of virtual ECUs 5 without conflictions between the writing and reading out of communication data. In addition, communication data can be efficiently exchanged between the plurality of virtual ECUs 5. That is to say, communication between the plurality of virtual ECUs 5 can be efficiently performed without access conflicts.

As described above, the third computation device 203 functions as the management unit 1. That is to say, one computation device 200 functions as the management unit 1. The management unit 1 realized by one computation device 200 performs the writing and reading out of communication data to and from the storage area 210. Therefore, it is possible to exchange communication data between a plurality of virtual ECUs 5 without conflictions between the writing and reading out of communication data to and from the storage area 210.

If the reception buffer update flag for the reception buffer 6*b* of a virtual ECU 5 is ON, the virtual ECU 5 reads out communication data from the reception buffer 6*b*. After reading out the communication data, the virtual ECU 5 switches the reception buffer update flag from ON to OFF. Therefore, it is possible to prevent communication data that has already been read out, from being read out again. The virtual ECU 5 can appropriately read out communication data that has been newly transmitted, by reading out communication data from the reception buffer 6*b* based on the reception buffer update flag.

After writing communication data to the transmission buffer 6*a*, the virtual ECU 5 turns on the transmission buffer update flag. If the transmission buffer update flag is ON, the management unit 1 writes the above communication data written to the transmission buffer 6*a*, to the storage area 210, and turns off the transmission buffer update flag after writing the communication data to the transmission buffer 6*a*. The communication data written to the transmission buffer 6*a* is read out based on the transmission buffer update flag, and therefore the management unit 1 can appropriately read out the newly transmitted communication data from the transmission buffer 6*a*.

The management unit 1 turns on the storage area update flag after writing the communication data to the transmission buffer 6*a*. If the storage area update flag is ON, the management unit 1 reads out communication data from the storage area 210, and writes the communication data thus read out, to the reception buffer 6*b* of the transmission destination virtual ECU 5. After the writing to the reception buffer 6*b*, the management unit 1 turns on the reception buffer update flag, and switches the storage area update flag from OFF to ON. The reading out of communication data from the storage area 210 and the writing of communication data to the reception buffer 6*b* are performed based on the storage area update flag. Therefore, the management unit 1 can distinguish a piece of communication data that has not been written to the reception buffer 6*b* from among the pieces of communication data written to the storage area 210. After writing communication data to the reception buffer 6*b*, the management unit 1 turns on the reception buffer update flag. Therefore, the virtual ECU 5 can appropriately read out the newly transmitted communication data from the reception buffer 6*b*.

Second Embodiment

In the configuration according to a second embodiment, the same components as those in the first embodiment are given the same reference numerals, and detailed descriptions thereof will be omitted. The second embodiment relates to on-board ECUs 2 that write communication data to the storage area 210 or the reception buffers 6*b* based on a count value indicating the number of times the communication data has been updated.

As in the first embodiment, each of the on-board ECUs 2 according to the second embodiment includes the control unit 20 that includes the first computation device 201, the second computation device 202, and the third computation device 203. As in the first embodiment, the first computation device 201 periodically generates the first virtual ECU 51. The second computation device 202 periodically and alternately generates the second virtual ECU 52 and the third virtual ECU 53. The third computation device 203 functions as a management unit 1.

For each of the transmission buffers 6*a* of the plurality of virtual ECUs 5 including the first virtual ECU 51, the second virtual ECU 52, and the third virtual ECU 53, a transmission buffer count value indicating the number of times communication data has been written to the transmission buffer 6*a* is provided for each communication data identifier. As with the transmission buffer update flag according to the first embodiment, the transmission buffer count value is associated with communication data for each communication data identifier in the transmission buffer 6*b*. Each virtual ECU 5, after writing communication data to the virtual ECU's own transmission buffer 6*a*, increments the transmission buffer count value for the written communication data by 1 in the transmission buffer 6*a*. That is to say, the virtual ECU 5 updates the transmission buffer count value. For example, when the virtual ECU 5 is to update the transmission buffer count value and the transmission buffer count value is at its maximum value, the virtual ECU 5 updates the transmission buffer count value to an initial value such as 0. Note that, as in the first embodiment, when writing communication data to the transmission buffer 6*a*, the virtual ECU 5 overwrites the already written communication data having the same identifier, with the communication data to be written.

In the storage area 210, a storage area count value indicating the number of times communication data has been written to the storage area 210 is provided for each communication data identifier. As with the storage area update flag according to the first embodiment, the storage area count value is associated with communication data for each communication data identifier, in the storage area 210. After writing communication data to the storage area 210, the management unit 1 increments the storage area count value for the written communication data by 1 in the storage area 210. That is to say, the management unit 1 updates the storage area count value. For example, when the storage area count value is at its maximum value, the management unit 1 updates the storage area count value to an initial value such as 0.

As in the first embodiment, the writing of communication data to the storage area 210 is performed by the management unit 1 during a period in which the virtual control units 5*a* of the virtual ECUs 5 are not assigned to the control unit 20. During the above period, the management unit 1 compares the transmission buffer count value with the storage area count value, and if the transmission buffer count value and the storage area count value are different from each other, the management unit 1 writes the communication data in the transmission buffer 6*a* to the storage area 210. Specifically, "if the transmission buffer count value and the storage area count value are different from each other" means "if the transmission buffer count value for one piece of communication data in the transmission buffer 6*a* and the storage area count value for the one piece of communication data in the storage area 210 are different from each other". In this case, the one piece of communication data in the transmission buffer 6*a* is communication data newly transmitted from the virtual ECU 5. As described above, if the transmission buffer count value and the storage area count value are different from each other, the management unit 1 reads out the communication data with the transmission buffer count value different from the storage area count value from the transmission buffer 6*a*, and writes the communication data to the storage area 210.

After writing the communication data to the storage area 210, the management unit 1 updates the storage area count value for the communication data to the same value as the transmission buffer count value. Specifically, the management unit 1 updates the storage area count value for the communication data written to the storage area 210 to the same value as the transmission buffer count value associated with the communication data with the same identifier as the identifier of the above communication data, in the transmission buffer 6*a*.

As in the first embodiment, for each of the reception buffers 6*b* of the plurality of virtual ECUs 5, a reception buffer update flag is provided for each communication data identifier. Also, for each of the reception buffers 6*b* of the plurality of virtual ECUs 5, a reception buffer count value indicating the number of times communication data has been written to the reception buffer 6*b* is provided for each communication data identifier. As with the reception buffer update flag, the reception buffer count value is associated with communication data for each communication data identifier in the reception buffer 6*b*. After writing the communication data to the reception buffer 6*b* of the transmission destination virtual ECU 5, the management unit 1 increments the reception buffer count value for the written communication data by 1, in the reception buffer 6*b*. That is to say, the management unit 1 updates the reception buffer count value. For example, when the management unit 1 is to update the reception buffer count value and the reception buffer count value is at its maximum value, the management unit 1 updates the reception buffer count value to an initial value such as 0.

Note that, as in the first embodiment, when writing communication data to the above storage area 210 and writing communication data to the reception buffer 6*b*, the management unit 1 overwrites the already written communication data having the same identifier, with the communication data to be written.

As in the first embodiment, the writing of communication data to the reception buffer 6*b* is performed by the management unit 1 during a period in which the virtual control units 5*a* of the virtual ECUs 5 are not assigned to the control unit 20. During the above period, the management unit 1 compares the storage area count value with the reception buffer count value for the reception buffer 6*b* of the virtual ECU 5 to operate next, and if the storage area count value and the reception buffer count value are different from each other, the management unit 1 writes the communication data in the storage area 210 in the reception buffer 6*b*. Specifically, "if the storage area count value and the reception buffer count value are different from each other" means "if the storage area count value of one piece of communication data in the storage area 210 and the reception buffer count value of the one piece of communication data in the above reception buffer 6*b* are different from each other". In this case, the one piece of communication data in the storage area 210 is the communication data to be newly transmitted. As described above, if the storage area count value and the reception buffer count value are different from each other, the management unit 1 reads out communication data whose storage area count value is different from the reception buffer count value, from the storage area 210, and writes the communication data to the reception buffer 6*b*.

After writing the communication data to the reception buffer 6*b*, the management unit 1 turns on the reception buffer update flag in the same manner as in the first embodiment. Furthermore, after writing the communication data to the reception buffer 6*b*, the management unit 1 updates the reception buffer count value for the communication data to the same value as the transmission buffer count value. Specifically, the management unit 1 updates the reception buffer count value for the communication data written to the reception buffer 6*b* to the same value as the storage area count value associated with the communication data having the same identifier as the identifier of the above communication data, in the storage area 210.

As in the first embodiment, the virtual ECU 5 reads out communication data whose reception buffer update flag is ON, from the reception buffer 6*b* of the virtual ECU. After reading out the communication data, the virtual ECU 5 switches the above reception buffer update flag from ON to OFF.

In the present embodiment, the communication data is written to the reception buffer 6*b* of each virtual ECU 5 based on the storage area count value and the reception buffer count value of the virtual ECU 5 as described above. For example, if communication data is written to each reception buffer 6*b* based on the storage area update flag as in the first embodiment, the storage area update flag is switched off when the communication data whose storage area update flag is ON is written to the reception buffers 6*b* of all the transmission destination virtual ECUs 5. In this case, the data already written to a reception buffer 6*b* may be written again to the reception buffer 6*b*, depending on the switching cycle of the virtual ECUs 5. That is to say, each virtual ECU 5 may read the same communication data as the communication data that has already been read out. The management unit 1 writes communication data to the reception buffers 6*b* based on the storage area count value and the reception buffer count value, and therefore the virtual ECU 5 is prevented from reading out the same communication data as the communication data that has already been read out.

Figure 8:
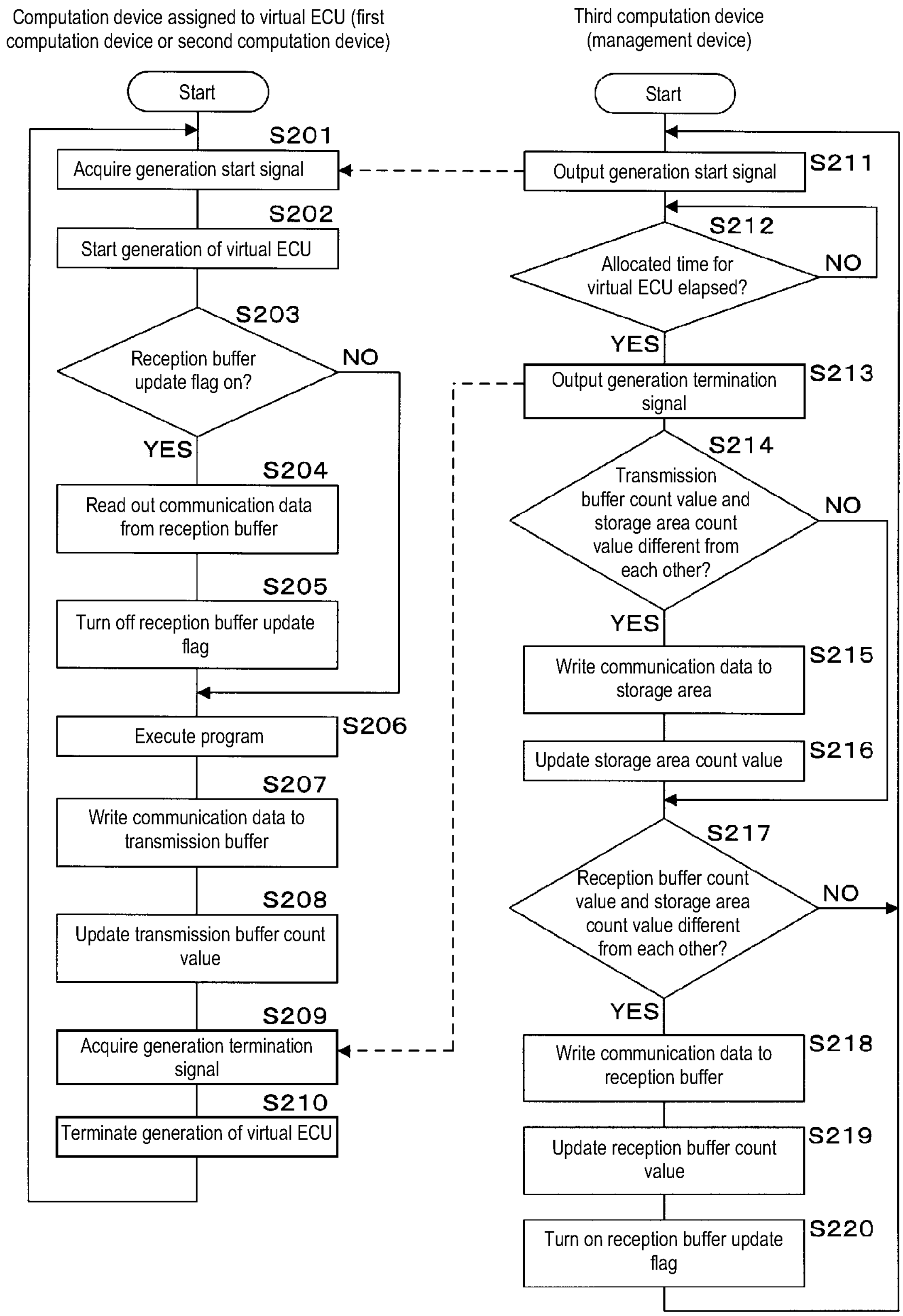
FIG. 8 is a flowchart illustrating processing performed by a third computing device, which functions as a management unit according to a second embodiment, and processing related to virtual ECU generation performed by a computing device to be assigned to a virtual ECU according to the second embodiment.

FIG. 8 is a flowchart illustrating the processing performed by the third computation device 203 functioning as the management unit 1 according to the second embodiment and the processing related to the generation of a virtual ECU 5 performed by the computation device 200 assigned to the virtual ECU 5 according to the second embodiment. In the present embodiment, the computation device 200 assigned to the virtual ECU 5 is the first computation device 201 or the second computation device 202. For example, the third computation device 203 performs the following processing as the management unit 1 when the IG switch (not shown) of the vehicle C transitions from OFF to ON. Also, the computation device 200 assigned to the virtual ECU 5 performs the following processing when the IG switch transitions from OFF to ON.

The computation device 200 assigned to the virtual ECU 5 performs the processing in S201 and S202. The processing in S201 and S202 is the same as the processing in S101 and S102 in the first embodiment, and therefore the detailed descriptions thereof will be omitted. In the first computation device 201, the generation of the first virtual ECU 51 is started. Also, in the second computation device 202, the generation of one of the second virtual ECU 52 and the third virtual ECU 53 is started.

The computation device 200 assigned to the virtual ECU 5 performs the processing in S203. The processing in S203 is the same as the processing in S103 in the first embodiment, and therefore the detailed descriptions thereof will be omitted. If the reception buffer update flag is not ON (S203:

NO), the computation device 200 assigned to the virtual ECU 5 performs the processing in S206 described below.

If the reception buffer update flag is ON, (S203: YES), the computation device 200 assigned to the virtual ECU 5 performs the processing in S204, S205, S206, and S207. The processing in S204, S205, S206, and S207 is the same as the processing in S104, S105, S106, and S107 in the first embodiment, and therefore the detailed descriptions thereof will be omitted. The computation device 200 assigned to the virtual ECU 5 updates the transmission buffer count value as described above (S208).

The computation device 200 assigned to the virtual ECU 5 performs the processing in S209 and S210. The processing in S209 and S210 is the same as the processing in S109 and S110 in the first embodiment, and therefore the detailed descriptions thereof will be omitted. Furthermore, the computation device 200 assigned to the virtual ECU 5 performs the processing in S201. The virtual ECU 5 to be generated is switched. Specifically, the first computation device 201 starts the generation of the first virtual ECU 51 again. The second computation device 202 starts the generation of the other of the second virtual ECU 52 and the third virtual ECU 53. The computation device 200 assigned to the virtual ECU 5 terminates processing when the IG switch transitions from ON to OFF, for example.

The third computation device 203 performs the processing in S211 and S212. The processing in S211 and S212 is the same as the processing in S111 and S112 in the first embodiment, and therefore the detailed descriptions thereof will be omitted. If the allocated time for the virtual ECU 5 has not elapsed (S212: NO), the third computation device 203 performs loop processing to perform the processing in S212 again. If the allocated time for the virtual ECU 5 has elapsed (S212: YES), the third computation device 203 performs the processing in S213. The processing in S213 is the same as the processing in S113 in the first embodiment, and therefore the detailed descriptions thereof will be omitted. Instead of the processing in S212, the third computation device 203 may perform wait processing from when the third computation device 203 causes the computation device 200 assigned to the virtual ECU 5 to start the generation of the virtual ECU 5 to when the allocated time for the virtual ECU 5 elapses. After the wait processing, the third computation device 203 performs the processing in S213.

The third computation device 203 determines whether or not the transmission buffer count value and the storage area count value are different from each other (S214). If the transmission buffer count value and the storage area count value are not different from each other (S214: NO), i.e., if the transmission buffer count value is the same value as the storage area count value, the third computation device 203 performs the processing in S217 described below.

If the transmission buffer count value and the storage area count value are different from each other (S214: YES), the third computation device 203 reads out the communication data with the transmission buffer count value different from the storage area count value from the transmission buffer 6*a*, and writes the communication data to the storage area 210 (S215), as described above. As described above, after writing communication data to the storage area 210, the third computation device 203 updates the storage area count value of the communication data to the same value as the above transmission buffer count value (S216).

The third computation device 203 determines whether or not the reception buffer count value for the reception buffer 6*b* of the virtual ECU 5 to operate next and the storage area count value are different from each other (S217). If the reception buffer count value and the storage area count value are different from each other (S217: YES), the third computation device 203 reads out the communication data whose storage area count value is different from the reception buffer count value, from the storage area 210, and writes the communication data to the above reception buffer 6*b* as described above (S218).

As described above, after writing the communication data to the reception buffer 6*b*, the third computation device 203 updates the reception buffer count value for the communication data (S219). Furthermore, the third computation device 203 turns on the reception buffer update flag for the written communication data (S220). The third computation device 203 performs the processing in S211, and performs the switching of the virtual ECU 5 for the first computation device 201 or the second computation device 202. Specifically, the third computation device 203 causes the first computation device 201 to start the generation of the first virtual ECU 51 again. Alternatively, the third computation device 203 causes the second computation device 202 to start the generation of the other of the second virtual ECU 52 and the third virtual ECU 53. The third computation device 203 terminates processing when the IG switch transitions from ON to OFF, for example.

If the reception buffer count value and the storage area count value are not different from each other (S217: NO), i.e., if the reception buffer count value is the same value as the storage area count value, the third computation device 203 performs the processing in S211. That is to say, the third computation device 203 performs the switching of the virtual ECU 5 for the first computation device 201 or the second computation device 202.

In the present embodiment, communication data written to the transmission buffer 6*a* is read out based on the transmission buffer count value and the storage area count value, and therefore communication data that has not been updated in the transmission buffer 6*a* can be prevented from being read out.

After writing communication data to the storage area 210, the management unit 1 updates the storage area count value. The management unit 1 reads out communication data from the storage area 210 based on the reception buffer count value and the storage area count value, and therefore, communication data that has not been updated in the storage area 210 can be prevented from being read out.

After writing communication data to the reception buffer 6*b*, the management unit 1 updates the reception buffer count value and turns on the reception buffer update flag. Therefore, communication data that has not been updated in the reception buffer 6*b* can be prevented from being read out.

For example, if any of the transmission buffer count value, the reception buffer count value, and the storage area count value has not been updated for a predetermined period or longer, the on-board ECU 2 may determine that a communication error has occurred between the virtual ECUs 5.

Third Embodiment

Figure 9:
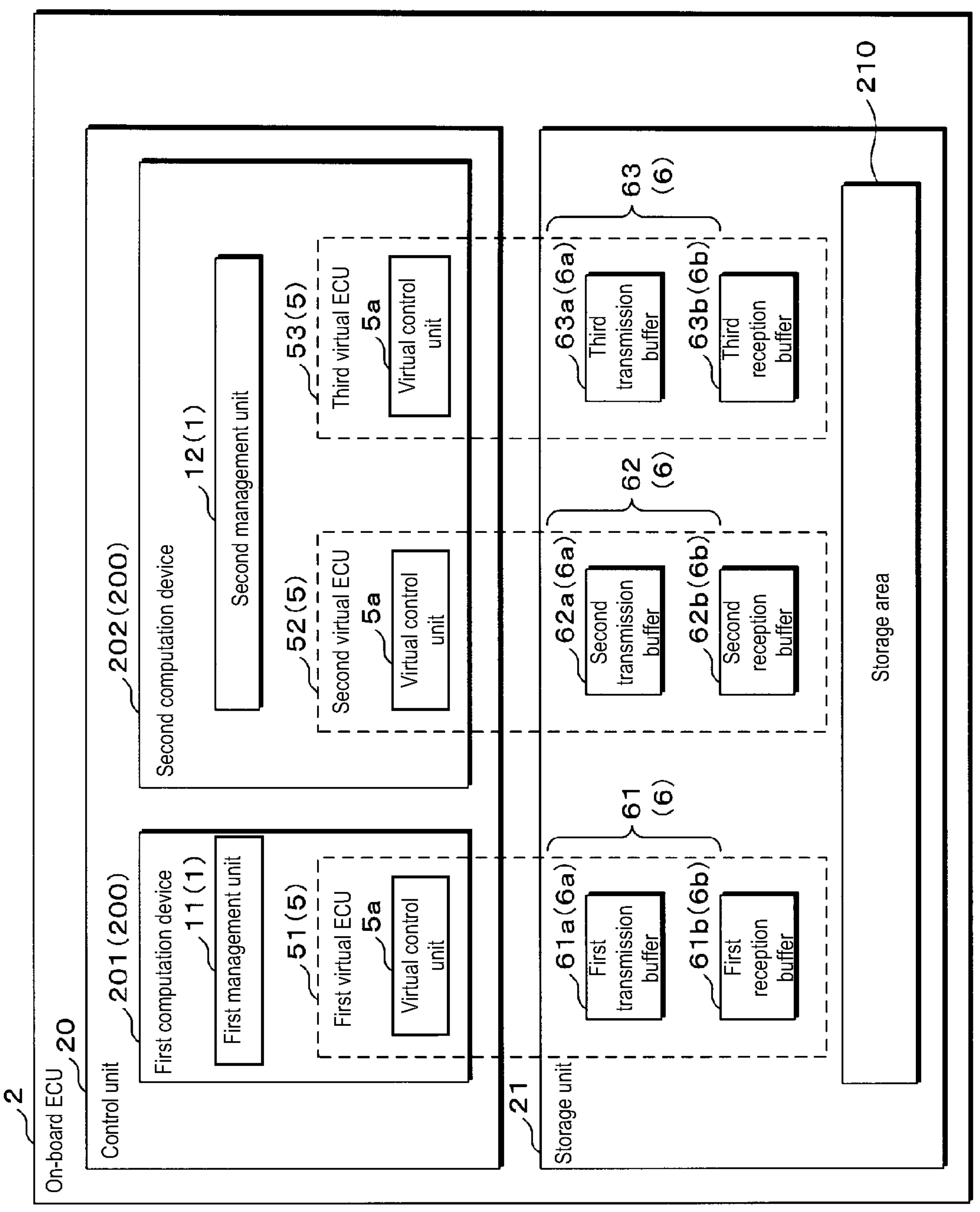
FIG. 9 is a block diagram illustrating a logical configuration of an on-board ECU according to a third embodiment.

FIG. 9 is a block diagram illustrating a logical configuration of an on-board ECU 2 according to a third embodiment. In the configuration according to the third embodiment, the same components as those in the first embodiment are given the same reference numerals, and detailed descriptions thereof will be omitted. The third embodiment relates to an on-board ECU 2 in which the computation device 200 of the control unit 20 periodically switches between a period in which the computation device 200 functions as a management unit 1 and a period in which the computation device 200 functions as a virtual ECU 5.

As shown in FIG. 9, the on-board ECU 2 according to the third embodiment includes a control unit 20 that includes two computation devices 200, namely the first computation device 201 and the second computation device 202. As in the first embodiment, the first virtual ECU 51 is generated in the first computation device 201. The virtual control unit 5*a* of the generated first virtual ECU 51 is assigned to the first computation device 201. Furthermore, the first computation device 201 functions as a management unit 1 that manages the virtual ECU 5 generated by the first computation device 201. That is to say, the first computation device 201 functions as a management unit 1 that manages the first virtual ECU 51. Hereinafter, the management unit 1 that manages the virtual ECU 5 generated by the first computation device 201 is also referred to as a first management unit 11. The first management unit 11 performs the switching of the virtual ECU 5 for the first computation device 201, and periodically causes the first computation device 201 to generate the first virtual ECU 51.

As in the first embodiment, the second virtual ECU 52 and the third virtual ECU 53 are periodically and alternately generated in the second computation device 202. The virtual control unit 5*a* of the generated second virtual ECU 52 is assigned to the second computation device 202. Also, the virtual control unit 5*a* of the generated third virtual ECU 53 is assigned to the second computation device 202. Furthermore, the second computation device 202 functions as a management unit 1 that manages the virtual ECU 5 generated by the second computation device 202. That is to say, the second computation device 202 functions as a management unit 1 that manages the second virtual ECU 52 and the third virtual ECU 53. Hereinafter, the management unit 1 that manages the virtual ECU 5 generated by the second computation device 202 is also referred to as a second management unit 12. The second management unit 12 performs the switching of the virtual ECU 5 for the second computation device 202, and periodically causes the second computation device 202 to alternately generate the second virtual ECU 52 and the third virtual ECU 53.

The storage unit 21 includes communication buffers that include a first communication buffer 61, a second communication buffer 62, and a third communication buffer 63, and the storage area 210. In the storage unit 21 according to the third embodiment, the virtual ECU 5 and the management unit 1 that can access the first communication buffer 61, the second communication buffer 62, the third communication buffer 63, and the storage area 210 have been determined in advance. In other words, access to the communication buffers 6 and the storage area 210 is limited. Access includes the writing and reading out of communication data. The access limitation protects the communication buffers 6 and the storage area 210. A memory protection device such as an MPU (Memory Protection Unit) is used for the access limitation described above, for example.

FIG. 10 is an illustrating showing an example of access limitation on the communication buffers 6 and the storage area 210. In FIG. 10, "-" indicates that access is prohibited. The first management unit 11 can access the first transmission buffer 61*a*, the first reception buffer 61*b*, and the storage area 210. That is to say, the first management unit 11 can access the communication buffers 6 of the virtual ECU 5 generated by the first computation device 201, and the storage area 210. The first management unit 11 cannot access the communication buffers 6 of the virtual ECU 5 generated by the second computation device 202. The communication buffers 6 of the virtual ECU 5 generated by the second computation device 202 are the second transmission buffer 62*a*, the second reception buffer 62*b*, the third transmission buffer 63*a*, and the third reception buffer 63*b*.

The first virtual ECU 51 can access the first transmission buffer 61*a* and the first reception buffer 61*b*. That is to say, the first virtual ECU 51 can access the communication buffers 6 of the virtual ECU. The first virtual ECU 51 cannot access the storage area 210, the second transmission buffer 62*a*, the second reception buffer 62*b*, the third transmission buffer 63*a*, or the third reception buffer 63*b*. That is to say, the first virtual ECU 51 cannot access the storage area 210 or the communication buffers 6 of the other virtual ECUs 5.

The second management unit 12 can access the second transmission buffer 62*a*, the second reception buffer 62*b*, the third transmission buffer 63*a*, the third reception buffer 63*b*, and the storage area 210. That is to say, the second management unit 12 can access the communication buffers 6 of the virtual ECU 5 generated by the second computation device 202, and the storage area 210. The second management unit 12 cannot access the communication buffers 6 of the virtual ECU 5 generated by the first computation device 201. The communication buffers 6 of the virtual ECU 5 generated by the first computation device 201 are the first transmission buffer 61*a* and the first reception buffer 61*b*.

The second virtual ECU 52 can access the second transmission buffer 62*a* and the second reception buffer 62*b*. That is to say, the second virtual ECU 52 can access the communication buffers 6 of the second virtual ECU 52. The second virtual ECU 52 cannot access the storage area 210, the first transmission buffer 61*a*, the first reception buffer 61*b*, the third transmission buffer 63*a*, or the third reception buffer 63*b*. That is to say, the second virtual ECU 52 cannot access the storage area 210 or the communication buffers 6 of the other virtual ECUs 5.

The third virtual ECU 53 can access the third transmission buffer 63*a* and the third reception buffer 63*b*. That is to say, the third virtual ECU 53 can access the communication buffers 6 of the third virtual ECU 53. The third virtual ECU 53 cannot access the storage area 210, the first transmission buffer 61*a*, the first reception buffer 61*b*, the second transmission buffer 62*a*, or the second reception buffer 62*b*. That is to say, the third virtual ECU 53 cannot access the storage area 210 or the communication buffers 6 of the other virtual ECUs 5.

Figure 11:
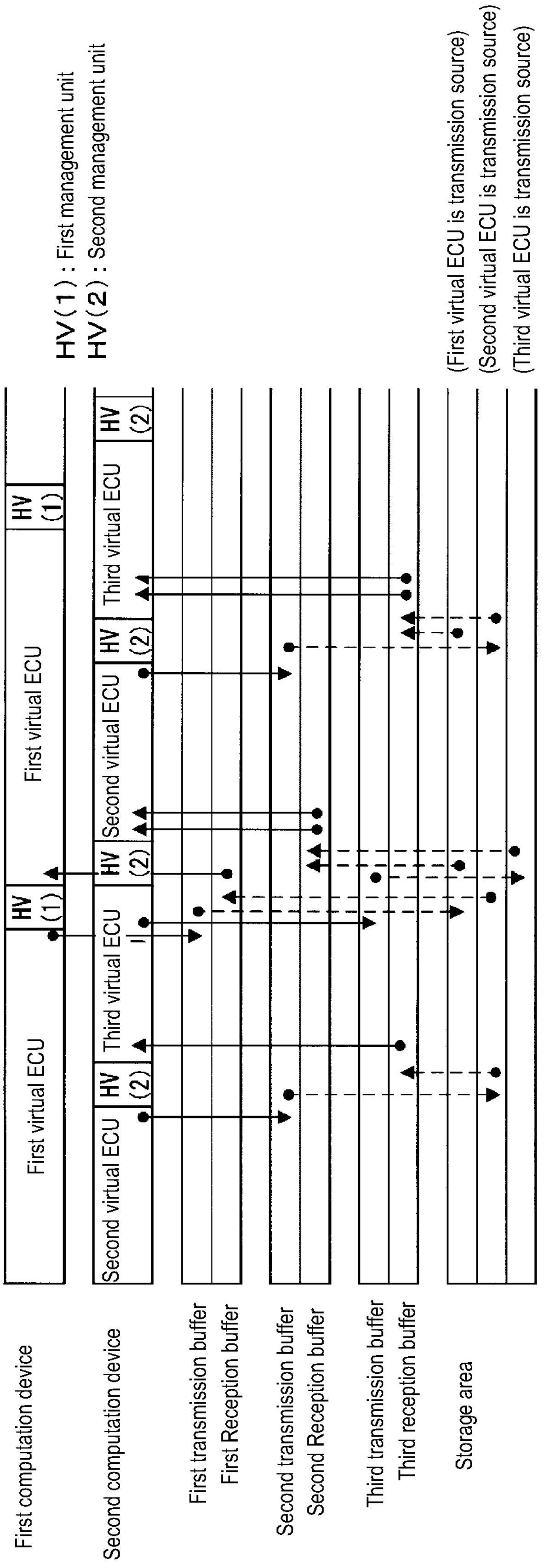
FIG. 11 is an illustration of an example of communication between a plurality of virtual ECUs according to the third embodiment.

FIG. 11 is an illustration of an example of communication between a plurality of virtual ECUs according to the third embodiment. In FIG. 11, the first management unit 11 is denoted as HV(1). The second management unit 12 is denoted as HV(2). The first computation device 201 periodically switches between a period in which the first computation device 201 functions as the first management unit 11 and a period in which the first computation device 201 generates the first virtual ECU 51. In other words, the first computation device 201 periodically switches between a period in which the first computation device 201 functions as the first management unit 11 and a period in which the first computation device 201 functions as the first virtual ECU 51. The second computation device 202 periodically switches between a period in which the second computation device 202 functions as the second management unit 12, a period in which the second computation device 202 generates the second virtual ECU 52, and a period in which the second computation device 202 generates the third virtual ECU 53. In other words, the second computation device 202 periodically switches between a period in which the second computation device 202 functions as the second management unit 12, a period in which the second computation device 202 functions as the second virtual ECU 52, and a period in which the second computation device 202 function as the third virtual ECU 53. As shown in FIG. 11, the period in which the first computation device 201 function as the first management unit 11 and the period in which the second computation device 202 functions as the second management unit 12 are set so as not to overlap each other. In FIG. 11, the solid arrows indicate the writing or reading out of communication data by the virtual ECUs 5. The dotted arrows indicate the writing or reading out of communication data by the management unit 1.

As in the first embodiment, the first virtual ECU 51 writes communication data to the first transmission buffer 61*a*, and turns on the transmission buffer flag of the communication data. The first virtual ECU 51 reads out communication data whose reception buffer update flag is ON in the first reception buffer 61*b* from the first reception buffer 61*b*, and turns off the reception buffer update flag of the communication data thus read out.

The first computation device 201 functions as the first management unit 11 during the period from when the generation of the first virtual ECU 51 is terminated to when the generation of the first virtual ECU 51 is started again. The period in which the first computation device 201 functions as the first management unit 11 is the period to which the virtual control unit 5*a* of the first virtual ECU 51 is not assigned to the first computation device 201. In other words, the period in which the first computation device 201 functions as the first management unit 11 is the period in which the first virtual ECU 51 is not operating. The first management unit 11 performs the following processing during the period in which the first computation device 201 functions as the first management unit 11.

As with the management unit 1 according to the first embodiment, the first management unit 11 writes the communication data whose transmission buffer update flag is ON in the first transmission buffer 61*a*, to the storage area 210. After writing the communication data to the storage area 210, the first management unit 11 turns on the storage area update flag of the written communication data, and turns off the above transmission buffer update flag.

Furthermore, the first management unit 11 writes, from among the pieces of communication data written to the storage area 210, a piece of communication data whose storage area update flag is ON and whose transmission destination is the virtual ECU 5 that is to start operation next, to the reception buffer of the virtual ECU 5 that is to start operation next. That is to say, the management unit 1 writes a piece of communication data whose storage area update flag is ON and whose transmission destination is the first virtual ECU 51, to the first reception buffer 61*b*. After writing the piece of communication data to the first reception buffer 61*b*, the first management unit 11 turns on the reception buffer update flag of the written piece of communication data. Furthermore, the first management unit 11 turns off the storage area update flag of the above communication data in the storage area 210. The first management unit 11 performs the switching of the virtual ECU 5 for the first computation device 201. In the first computation device 201, the generation of the first virtual ECU 51 is started again.

As in the first embodiment, the second virtual ECU 52 writes communication data to the second transmission buffer 62*a*, and turns on the transmission buffer flag of the communication data. The second virtual ECU 52 reads out communication data whose reception buffer update flag is ON in the second reception buffer 62*b* from the second reception buffer 62*b*, and turns off the reception buffer update flag of the communication data thus read out.

As in the first embodiment, the third virtual ECU 53 writes communication data to the third transmission buffer 63*a*, and turns on the transmission buffer flag of the communication data. The third virtual ECU 53 reads out communication data whose reception buffer update flag is ON in the third reception buffer 63*b* from the third reception buffer 63*b*, and turns off the reception buffer update flag of the communication data thus read out.

The second computation device 202 functions as the second management unit 12 during the period from when the second computation device 202 terminates the generation of one of the second virtual ECU 52 and the third virtual ECU 53 and when the second computation device 202 starts the generation of the other of the second virtual ECU 52 and the third virtual ECU 53. The period in which the second computation device 202 functions as the second management unit 12 is the period to which the virtual control units 5*a* of both the second virtual ECU 52 and the third virtual ECU 53 are assigned to the second computation device 202. In other words, the period in which the second computation device 202 functions as the second management unit 12 is the period in which the second virtual ECU 52 and the third virtual ECU 53 are not operating. The second management unit 12 performs the following processing during the period in which the second computation device 202 functions as the second management unit 12.

As with the management unit 1 according to the first embodiment, the second management unit 12 writes the communication data whose transmission buffer update flag is ON in the second transmission buffer 62*a* of the third transmission buffer 63*a*, to the storage area 210. After writing the communication data to the storage area 210, the second management unit 12 turns on the storage area update flag of the written communication data, and, furthermore, turns off the transmission buffer update flag of the above communication data.

Furthermore, the second management unit 12 writes, from among the pieces of communication data written to the storage area 210, a piece of communication data whose storage area update flag is ON and whose transmission destination is the virtual ECU 5 that is to start operation next, to the reception buffer 6*b* of the virtual ECU 5 that is to start operation next. For example, if the virtual ECU 5 that is to start operation next is the second virtual ECU 52, the second management unit 12 writes a piece of communication data whose storage area update flag is ON and whose transmission destination is the second virtual ECU 52, to the second reception buffer 62*b*. If the virtual ECU 5 that is to start operation next is the third virtual ECU 53, the second management unit 12 writes a piece of communication data whose storage area update flag is ON and whose transmission destination is the third virtual ECU 53, to the third reception buffer 63*b*.

After writing the piece of communication data to the reception buffer 6*b*, the second management unit 12 turns on the reception buffer update flag of the written piece of communication data. Furthermore, the second management unit 12 turns off the storage area update flag of the above communication data in the storage area 210. The second management unit 12 performs the switching of the virtual ECU 5 for the second computation device 202. The generation of the other of the second virtual ECU 52 and the third virtual ECU 53 is generated in the second computation device 202.

In the present embodiment, the transmission buffer update flag, the storage area update flag, and the reception buffer update flag are used to exchange communication data between the plurality of virtual ECUs 5. As in the second embodiment, the transmission buffer count value, the storage area count value, the reception buffer count value, and the reception buffer update flag may be used to exchange communication data.

Figure 12:
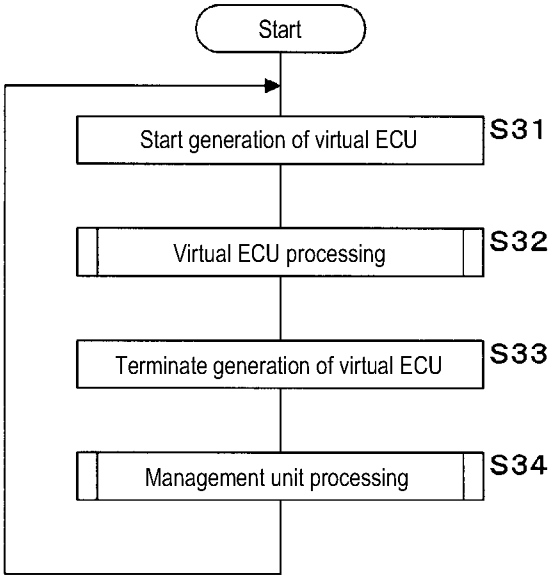
FIG. 12 is a flowchart for a main routine, illustrating processing performed by a computing device according to the third embodiment.
Figure 13:
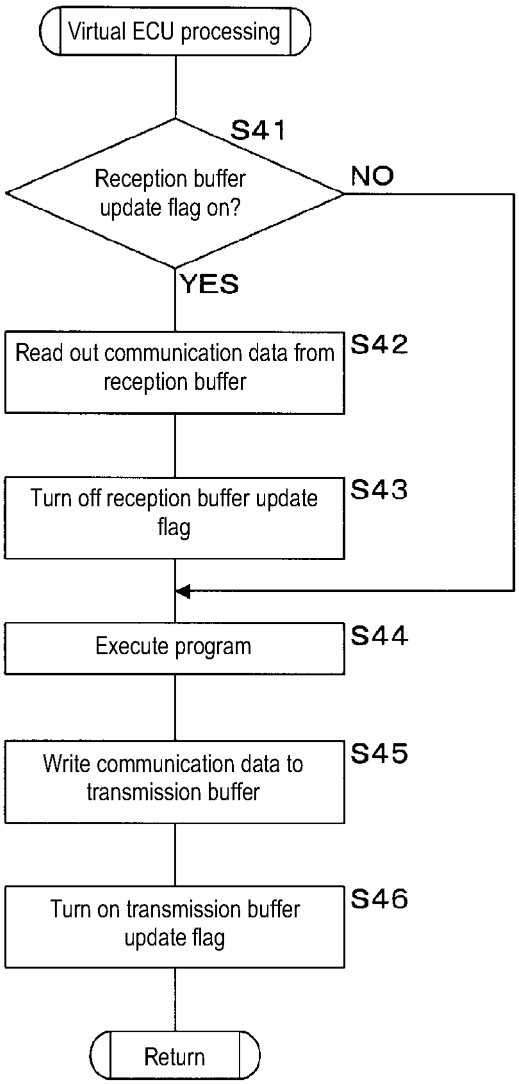
FIG. 13 is a flowchart illustrating processing procedures carried out by a computing device, related to a subroutine of processing for a virtual ECU.
Figure 14:
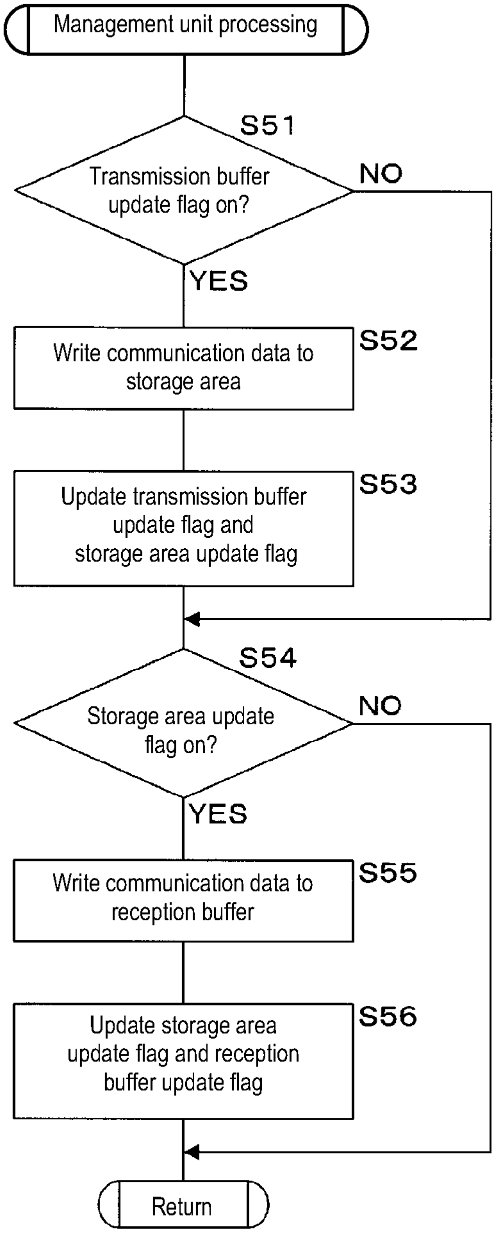
FIG. 14 is a flowchart illustrating processing procedures carried out by a computing device, related to a subroutine of processing for a management unit.

FIG. 12 is a flowchart for a main routine, illustrating processing performed by a computing device 200 according to the third embodiment. FIG. 13 is a flowchart illustrating processing procedures carried out by the computing device 200, related to a subroutine of the processing for a virtual ECU 5. FIG. 14 is a flowchart illustrating processing procedures carried out by the computing device 200, related to a subroutine of the processing for the management unit 1. For example, the computation device 200 performs the following processing when the IG switch (not shown) of the vehicle C transitions from OFF to ON.

The computation device 200 starts the generation of a virtual ECU 5 (S31). Specifically, the first computation device 201 starts the generation of the first virtual ECU 51. The second computation device 202 starts the generation of one of the second virtual ECU 52 and the third virtual ECU 53. The computation device 200 calls and executes a subroutine of the processing for the virtual ECU 5 (S32).

Hereinafter, processing related to the subroutine of the processing for the virtual ECU 5 performed by the computation device 200 will be described with reference to FIG. 13. The computation device 200 performs the processing in S41. The processing in S41 is the same as the processing in S103 in the first embodiment, and therefore the detailed descriptions thereof will be omitted. If the reception buffer update flag is ON (S41: YES), the computation device 200 performs the processing in S42, S43, S44, S45, and S46. The processing in S42, S43, S44, S45, and S46 are the same as the processing in S104, S105, S106, S107, and S108 in the first embodiment, and therefore the detailed descriptions thereof will be omitted. The computation device 200 returns to the main routine. If the reception buffer update flag is not ON (S41: NO), the computation device 200 performs the processing in S44, S45, and S46, and returns to the main routine.

As shown in FIG. 12, the computation device 200 terminates the generation of the virtual ECU 5 (S33). Specifically, the first computation device 201 terminates the generation of the first virtual ECU 51. The second computation device 202 terminates the generation of the one of the second virtual ECU 52 and the third virtual ECU 53. The computation device 200 calls and executes a subroutine of the processing for the management unit 1 (S34). The first computation device 201 functions as the first management unit 11. The second computation device 202 functions as the second management unit 12.

Hereinafter, processing related to the subroutine of the processing for a management unit 1 performed by the computation device 200 will be described with reference to FIG. 14. The computation device 200 performs the processing in S51. The processing in S51 is the same as the processing in S114 in the first embodiment, and therefore the detailed descriptions thereof will be omitted.

If the transmission buffer update flag is ON (S51: YES), the computation device 200 performs the processing in S52, S53, and S54. The processing in S52, S53, and S54 is the same as the processing in S115, S116, and S117 in the first embodiment, and therefore the detailed descriptions thereof will be omitted. If the transmission buffer update flag is not ON (S51: NO), the computation device 200 performs the processing in S54.

If the storage area update flag is ON (S54: YES), the computation device 200 performs the processing in S55 and S56, and returns to the main routine. The processing in S55 and S56 is the same as the processing in S118 and S119 in the first embodiment, and therefore the detailed descriptions thereof will be omitted. If the storage area update flag is not ON (S54: NO), the computation device 200 returns to the main routine.

As shown in FIG. 12, the computation device 200 performs the processing in S31. Specifically, the first computation device 201 starts the generation of the first virtual ECU 51 again. The second computation device 202 starts the generation of the other of the second virtual ECU 52 and the third virtual ECU 53. The period in which the computation device 200 functions as a management unit 1 and the period in which the computation device 200 functions as a virtual ECU 5 are periodically switched. The computation device 200 terminates processing when the IG switch transitions from ON to OFF, for example.

In the present embodiment, each of the plurality of instances of computation device 200 included in the control unit 20 periodically switches the period in which the computation device 200 functions as a management unit 1 and the period in which the computation device 200 functions as a virtual ECU 5. The period in which one instance of computation device 200 functions as a management unit 1 and the period in which another instance of computation device 200 functions as a management unit 1 do not overlap each other. Therefore, it is possible to exchange communication data between a plurality of virtual ECUs 5 without conflictions between the writing and reading out of communication data to and from the storage area 210.

In the present embodiment, the first management unit 11, which is an instance of the management unit 1 that the first computation device 201 functions as, can access the communication buffers 6 of the virtual ECU 5 generated by the first computation device 201, but cannot access the communication buffers 6 of the virtual ECU 5 generated by the second computation device 202. It is possible to prevent the first management unit 11 from accidentally writing or reading out communication data to or from the second communication buffer 62 or the third communication buffer 63. The second management unit 12, which is an instance of the management unit 1 that the second computation device 202 functions as, can access the communication buffers 6 of the virtual ECU 5 generated by the second computation device 202, but cannot access the communication buffers 6 of the virtual ECU 5 generated by the first computation device 201. It is possible to prevent the second management unit 12 from accidentally writing or reading out communication data to or from the first communication buffer 61.

Each virtual ECU 5 can access the communication buffers 6 of the virtual ECU 5, but cannot access the communication buffers 6 of other virtual ECUs 5 or the storage area 210. It is possible to prevent each virtual ECU 5 from writing or reading out communication data to or from the communication buffers 6 of other virtual ECUs 5. Also, it is possible to prevent each virtual ECU 5 from erroneously writing or reading out communication data to or from the storage area 210.

Fourth Embodiment

In the configuration according to the fourth embodiment, the same components as those in the first embodiment are given the same reference numerals, and detailed descriptions thereof will be omitted. The fourth embodiment relates to an on-board ECU 2 in which the management unit 1 writes communication data written to the storage area 210, to a program execution area of the transmission destination virtual ECU 5, which will be described below.

In the on-board ECU 2 according to the fourth embodiment, the control unit 20 includes the first computation device 201, the second computation device 202, and the third computation device 203. The first computation device 201 and the second computation device 202 generate virtual ECUs 5 as in the first embodiment. The third computation device 203 functions as the first management unit 1 as in the first embodiment. A communication buffer 6 of each virtual ECU 5 according to the fourth embodiment includes a program execution storage area used by the virtual ECU 5 to execute a program. Specifically, the program execution storage area is included in a reception buffer 6*b*. Note that the communication buffers 6 are assigned to the storage unit 21, and the program execution storage area is included in the storage unit 21. Therefore, the program execution storage area is included in the storage unit 21 for each virtual ECU 5.

The program execution storage area is a so-called variable area. When a program is to be executed, the communication data used to execute the program is written to the program execution storage area of the virtual ECU 5 that executes the program. In the execution of the program, the program execution storage area to which the above communication data is written is indicated by a logical address.

As in the first embodiment, the virtual ECU 5 writes the communication data to the transmission buffer 6*a*, and sets the transmission buffer update flag. As in the first embodiment, the management unit 1 writes the communication data written to the transmission buffer 6*a*, to the storage area 210, based on the transmission buffer update flag, and sets the storage area update flag.

If the storage area update flag is ON, the management unit 1 writes the communication data whose storage area update flag is ON to the program execution storage area included in the reception buffer 6*b*, of the reception buffer 6*b* of the transmission destination virtual ECU 5. The program execution storage area is included in the reception buffer 6*b*, and is therefore included in the storage unit 21. When writing communication data to the program execution storage area, the management unit 1 references an address table, for example, and writes the communication data at the logical address of the program execution storage area in which the program using the communication data is executed. Specifically, the management unit 1 writes the communication data at a physical address corresponding to the above logical address in the storage unit 21. The communication data is exchanged between a plurality of virtual ECUs 5. FIG. 15 is a conceptual diagram illustrating the content of the address table. The address table in FIG. 15 stores the identifiers of piece of communication data, and, stores, for each of the identifiers, the logical address at which the piece of communication data is to be written and the physical address at which the piece of communication data is to be written. After writing communication data, the management unit 1 turns on the reception buffer update flag of the communication data. If the reception buffer update flag is ON, the virtual ECU 5 executes the program, using the written communication data.

The method through which the management unit 1 writes communication data to the program execution storage area is not limited to the method in which the address table is used. For example, when a communication data or the identifier of communication data is input, the management unit 1 may write the communication data to the program execution storage area, using a function for outputting the logical address at which the communication data is to be written, or the physical address at which the communication data is to be written. The address table or the above function are stored in the storage unit 21, such as a virtual storage unit, which is included in each virtual ECU 5.

In the present embodiment, the communication buffers 6 each include a program execution storage area used to execute a program. The program execution storage area is a so-called variable area, and is provided for each virtual ECU 5. The program execution storage area is indicated by a logical address. The management unit 1 writes the communication data written to the storage area 210 to the program execution storage area of the transmission destination virtual ECU 5. The management unit 1 writes the communication data directly to the program execution storage area. Therefore, the virtual ECU 5 need not perform processing to write the communication data to the program execution storage area. Therefore, it is possible to reduce the amount of processing to be performed by the virtual ECU 5.

For example, the reception buffer 6*b* in the first embodiment does not include the program execution storage area. When executing a program, the virtual ECU 5 in the first embodiment needs to read out communication data written to the reception buffer 6*b*, and write the communication data to the area indicated by the logical address associated with the identifier of the communication data, of the areas of the storage unit 21 assigned to the above virtual ECU 5. That is to say, when executing the program, the virtual ECU 5 needs to read out the communication data written to the reception buffer 6*b*, and write the communication data thus read out, to the program execution storage area.

The on-board ECU 2 may be configured so that, as in the second embodiment, the transmission buffer count value, the storage area count value, the reception buffer count value, and the reception buffer update flag are used to exchange communication data between a plurality of virtual ECUs 5. The on-board ECU 2 may be configured so that, as in the third embodiment, each instance of the computation device 200 switches between the period in which the device functions as the management unit 1 and the period in which the device functions as a virtual ECU 5.

The embodiments disclosed herein are illustrative in all respects and should be considered not restrictive. The scope of the present disclosure is not indicated by the above meanings, but is indicated by the scope of the claims, and is intended to include all modifications within the meaning and scope of equivalents to the scope of the claims.

The invention claimed is:

1. An on-board device comprising:

a control unit that executes a plurality of programs; and a storage unit that stores therein a virtualization operating system that is to be started up by the control unit, wherein a plurality of virtual devices that serve as operation environments for the programs are generated by starting up the virtualization operating system, each of the virtual devices:

includes a communication buffer to which an area divided from the storage unit is assigned, and to which communication data that is exchanged through communication between the plurality of virtual devices is to be written; and writes the communication data addressed to another virtual device, to the virtual device's own communication buffer when communicating with the other virtual device, a management unit that manages the plurality of virtual devices:

reads out the communication data written to the communication buffer of the virtual device, during a period in which the virtual device is not operating;

writes the communication data thus read out, to a storage area that is accessible to the management unit; and writes the communication data written to the storage area, to the communication buffer of the other virtual device, during a period in which the other virtual device that is a transmission destination of the communication data is not operating, and the other virtual device reads out the communication data transmitted from the virtual device, written to the other virtual device's own communication buffer, and wherein the control unit includes a plurality of computation devices, each of the computation devices:

functions as the management unit or the virtual device; and periodically switches between a period in which the computation device functions as the management unit and a period in which the computation device functions as the virtual device, and a period in which one computation device of the plurality of computation devices functions as the management unit and a period in which another computation device of the plurality of computation devices functions as the management unit do not overlap each other.

2. The on-board device according to claim 1, wherein the control unit includes a plurality of computation devices, one computation device of the plurality of computation devices functions as the management unit, and the other computation devices of the plurality of computation devices function as the virtual devices.

3. The on-board device according to claim 2, wherein the communication buffer includes a reception buffer to which the communication data to be received by the virtual device is written, the virtual device:

reads out the communication data written to the reception buffer if a reception buffer update flag indicating that the communication data written to the reception buffer has been updated is ON; and switches the reception buffer update flag from ON to OFF after reading out the communication data.

4. The on-board device according to claim 2, wherein the communication buffer includes a program execution storage area used to execute the programs, and the management unit writes the communication data written to the storage area, to the program execution storage area of the virtual device at a transmission destination.

5. The on-board device according to claim 1, wherein the one computation device functions as the management unit that manages the virtual device generated in the one computation device, the management unit that manages the virtual device generated in the one computation device:

can access the communication buffer of the virtual device generated in the one computation device, and the storage area; and cannot access the communication buffer of the virtual device generated in the other computation device, and the virtual device:

can access the virtual device's own communication buffer; and cannot access the communication buffer of the other virtual device or the storage area.

6. The on-board device according to claim 5, wherein the communication buffer includes a reception buffer to which the communication data to be received by the virtual device is written, the virtual device:

reads out the communication data written to the reception buffer if a reception buffer update flag indicating that the communication data written to the reception buffer has been updated is ON; and switches the reception buffer update flag from ON to OFF after reading out the communication data.

7. The on-board device according to claim 5, wherein the communication buffer includes a program execution storage area used to execute the programs, and the management unit writes the communication data written to the storage area, to the program execution storage area of the virtual device at a transmission destination.

8. The on-board device according to claim 1, wherein the communication buffer includes a reception buffer to which the communication data to be received by the virtual device is written, the virtual device:

reads out the communication data written to the reception buffer if a reception buffer update flag indicating that the communication data written to the reception buffer has been updated is ON; and switches the reception buffer update flag from ON to OFF after reading out the communication data.

9. The on-board device according to claim 8, wherein the communication buffer includes a transmission buffer to which the communication data to be transmitted by the virtual device to the other virtual device is written, the virtual device turns on a transmission buffer update flag indicating that the communication data written to the transmission buffer has been updated, after writing the communication data to the transmission buffer, the management unit:

writes the communication data written to the transmission buffer of the virtual device, to the storage area, if the transmission buffer update flag is ON;

switches the transmission buffer update flag from ON to OFF after writing the communication data to the storage area;

turns on a storage area update flag indicating that the communication data written to the storage area has been updated;

writes the communication data written to the storage area, to the reception buffer of the other virtual device if the storage area update flag is ON;

turns on the reception buffer update flag after writing the communication data to the reception buffer; and switches the storage area update flag from ON to OFF.

10. The on-board device according to claim 9, wherein the communication buffer includes a program execution storage area used to execute the programs, and the management unit writes the communication data written to the storage area, to the program execution storage area of the virtual device at a transmission destination.

11. The on-board device according to claim 8, wherein the communication buffer includes a transmission buffer to which the communication data to be transmitted by the virtual device to the other virtual device is written, the virtual device updates a transmission buffer count value indicating the number of times the communication data has been written to the transmission buffer, after writing the communication data to the transmission buffer, the management unit:

writes the communication data written to the transmission buffer of the virtual device, to the storage area if the transmission buffer count value and a storage area count value indicating the number of times the communication data has been written to the storage area are different from each other;

updates the storage area count value to the same value as the transmission buffer count value after writing the communication data to the storage area;

writes the communication data written to the storage area, to the reception buffer of the other virtual device if the storage area count value and a reception buffer count value indicating the number of times the communication data has been written to the reception buffer are different from each other;

updates the reception buffer count value to the same value as the storage area count value after writing the communication data to the reception buffer; and turns on the reception buffer update flag.

12. The on-board device according to claim 11, wherein the communication buffer includes a program execution storage area used to execute the programs, and the management unit writes the communication data written to the storage area, to the program execution storage area of the virtual device at a transmission destination.

13. The on-board device according to claim 8, wherein the communication buffer includes a program execution storage area used to execute the programs, and the management unit writes the communication data written to the storage area, to the program execution storage area of the virtual device at a transmission destination.

14. The on-board device according to claim 1, wherein the communication buffer includes a program execution storage area used to execute the programs, and the management unit writes the communication data written to the storage area, to the program execution storage area of the virtual device at a transmission destination.

15. An information processing method comprising:

providing a control unit of an on-board device, the control unit including a plurality of computation devices, each of the computation devices functioning as a management unit or a virtual device and periodically switching between a period in which the computation device functions as the management unit and a period in which the computation device functions as the virtual device, and periods in which different computation devices function as the management unit do not overlap;

generating a plurality of virtual devices that serve as operation environments for a plurality of programs, in an on-board device;

when each virtual device communicates with another virtual device, writing communication data addressed to the other virtual device, to a communication buffer that is included in the virtual device and to which the communication data that is exchanged through communication between the plurality of virtual devices is to be written;

reading out the communication data written to the communication buffer of the virtual device, during a period in which the virtual device is not operating;

writing the communication data thus read out, to a storage area;

writing the communication data written to the storage area, to the communication buffer of the other virtual device, during a period in which the other virtual device that is a transmission destination of the communication data is not operating; and reading out the communication data transmitted from the virtual device, written to the communication buffer of the other virtual device.

16. A computer program for enabling a computer mounted on a vehicle the computer including a control unit having a plurality of computation devices, each of the computation devices functioning as the management unit or the virtual device, the computer program enabling the computer to carry out processing to:

periodically switch between a period in which the computation device functions as the management unit and a period in which the computation device functions as the virtual device, and periods in which different computation devices function as the management unit do not overlap;

generate a plurality of virtual devices that serve as operation environments for a plurality of programs;

when each virtual device communicates with another virtual device, write communication data addressed to the other virtual device, to a communication buffer that is included in the virtual device and to which the communication data that is exchanged through communication between the plurality of virtual devices is to be written;

read out the communication data written to the communication buffer of the virtual device, during a period in which the virtual device is not operating;

write the communication data thus read out, to a storage area;

write the communication data written to the storage area, to the communication buffer of the other virtual device, during a period in which the other virtual device that is a transmission destination of the communication data is not operating; and read out the communication data transmitted from the virtual device, written to the communication buffer of the other virtual device.

* * * * *